(12) United States Patent
Hayashi et al.

(10) Patent No.: US 11,976,180 B2
(45) Date of Patent: May 7, 2024

(54) XANTHOGEN COMPOUND DISPERSION, CONJUGATED-DIENE-BASED POLYMER LATEX COMPOSITION, AND FILM MOLDED BODY

(71) Applicant: ZEON CORPORATION, Tokyo (JP)

(72) Inventors: Misa Hayashi, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 580 days.

(21) Appl. No.: 17/274,277

(22) PCT Filed: Aug. 1, 2019

(86) PCT No.: PCT/JP2019/030374
§ 371 (c)(1),
(2) Date: Mar. 8, 2021

(87) PCT Pub. No.: WO2020/054248
PCT Pub. Date: Mar. 19, 2020

(65) Prior Publication Data
US 2021/0332224 A1  Oct. 28, 2021

(30) Foreign Application Priority Data

Sep. 14, 2018 (JP) ................................. 2018-172270
Sep. 14, 2018 (JP) ................................. 2018-172271

(51) Int. Cl.
| | |
|---|---|
| C08C 19/36 | (2006.01) |
| C08K 5/38 | (2006.01) |
| C08L 15/00 | (2006.01) |
| C08L 71/02 | (2006.01) |

(52) U.S. Cl.
CPC .............. C08L 15/00 (2013.01); C08C 19/36 (2013.01); C08K 5/38 (2013.01); *C08K 2201/005* (2013.01); *C08L 71/02* (2013.01); *C08L 2201/54* (2013.01); *C08L 2203/16* (2013.01); *C08L 2203/30* (2013.01)

(58) Field of Classification Search
CPC ..... C08K 5/38; C08L 7/00; C08L 9/00; C08L 11/00; C08L 13/00; C08L 15/00
See application file for complete search history.

(56) References Cited

U.S. PATENT DOCUMENTS

| | | | | |
|---|---|---|---|---|
| 4,051,316 | A | * | 9/1977 | Wing ........................ C08B 31/06 536/108 |
| 4,251,409 | A | | 2/1981 | Neubert |
| 4,285,850 | A | | 8/1981 | Neubert |
| 4,289,683 | A | | 9/1981 | Neubert |
| 4,300,972 | A | | 11/1981 | Neubert |
| 2009/0272384 | A1 | | 11/2009 | Lucas et al. |
| 2012/0031408 | A1 | | 2/2012 | Lucas et al. |
| 2013/0291873 | A1 | | 11/2013 | Lucas et al. |
| 2014/0186628 | A1 | | 7/2014 | Lucas et al. |
| 2015/0259451 | A1 | | 9/2015 | Lucas et al. |
| 2015/0376322 | A1 | | 12/2015 | Nakamura et al. |
| 2016/0017109 | A1 | | 1/2016 | Bostyn |
| 2017/0298159 | A1 | | 10/2017 | Lucas et al. |
| 2020/0056019 | A1 | | 2/2020 | Aihara et al. |

FOREIGN PATENT DOCUMENTS

| | | | |
|---|---|---|---|
| CN | 102775653 | A | 11/2012 |
| CN | 105399997 | A | 3/2016 |
| CN | 108175028 | * | 6/2018 |
| CN | 108175028 | A | 6/2018 |
| EP | 0302462 | * | 8/1988 |
| JP | S55-142635 | A | 11/1980 |
| JP | 2006-160804 | A | 6/2006 |
| JP | 2009-220841 | A | 10/2009 |
| JP | 2011-519606 | A | 7/2011 |
| JP | 2012-158694 | A | 8/2012 |
| JP | 2014-181335 | A | 9/2014 |
| JP | 2016-33171 | A | 3/2016 |
| TW | 1539979 | * | 7/2016 |
| WO | 2014/129547 | A1 | 8/2014 |
| WO | 2018/155243 | A1 | 8/2018 |

OTHER PUBLICATIONS

Vehring et al., electronic translation of TW 1539979 (Jul. 2016).*
Schleicher et al., electronic translation of EP 0302462 (Aug. 1988).*
Hua, electronic translation of CN 108175028 (Jun. 2018).*
"Vulcanization and vulcanized adjustment;" 1983; pp. 152-153; first edition, first printing.
Komatsu et al.; "Vulcanization Accelerators;" Nippon Gomu Kyokaishi; 2009; pp. 33(43)-38(48); vol. 82, No. 1.
Shiraki; "Reinforcement (part 1) inorganic reinforcing agent;" Nippon Gomu Kyokaishi; 1980; pp. 17(45)-33(61); vol. 53, No. 1.
Oct. 15, 2019 Search Report issued in International Patent Application No. PCT/JP2019/030374.
Oct. 15, 2019 Search Report issued in International Patent Application No. PCT/JP2019/030373.
Mar. 9, 2021 International Preliminary Report on Patentability issued in International Patent Application No. PCT/JP2019/030374.
Mar. 9, 2021 International Preliminary Report on Patentability issued in International Patent Application No. PCT/JP2019/030373.
Sep. 25, 2022 Office Action issued in Indonesian Patent Application No. P00202102324.
May 2, 2022 Extended European Search Report issued in Patent Application No. 19858981.4.
Jan. 26, 2024 Office Action issued in Indonesian Patent Application No. P00202102324.

* cited by examiner

*Primary Examiner* — John M Cooney
*Assistant Examiner* — Jeffrey S Lenihan
(74) *Attorney, Agent, or Firm* — Oliff PLC

(57) ABSTRACT

A xanthogen compound dispersion is formed by dispersing a xanthogen compound in water or alcohol, wherein a volume average particle size of the xanthogen compound is 0.001 to 9 μm.

7 Claims, No Drawings

XANTHOGEN COMPOUND DISPERSION, CONJUGATED-DIENE-BASED POLYMER LATEX COMPOSITION, AND FILM MOLDED BODY

TECHNICAL FIELD

The present invention relates to a xanthogen compound dispersion, a conjugated diene polymer latex composition, and a molded film such as a dip-molded product. More specifically, the present invention relates to a xanthogen compound dispersion that is capable of suppressing onset of symptoms of delayed allergy (Type IV) in addition to immediate allergy (Type I) and can provide a molded film such as a dip-molded product having high tear strength and excellent stability of tear strength, and in which occurrence of a pinhole is effectively suppressed, when used as a vulcanization accelerator of a polymer such as a conjugated diene polymer and famed into a molded film such as a dip-molded product. Further, the present invention relates to a conjugated diene polymer latex composition obtained by using such a xanthogen compound dispersion and a molded film such as a dip-molded product obtained by using such a conjugated diene polymer latex composition.

BACKGROUND ART

Conventionally, it is known that dip-molded products used in contact with human bodies, such as nipples, balloons, gloves, balloons, and stalls, are obtained by dip-molding a latex composition containing natural rubber latex. However, natural rubber latex contains proteins that cause symptoms of immediate allergy (Type I) in human bodies and therefore may be problematic as dip-molded products that directly contact the mucosa or organs of living bodies. Therefore, use of a synthetic rubber latex instead of a natural rubber latex has been studied.

For example, Patent Document 1 discloses a latex composition mixing zinc oxide, sulfur, and a vulcanization accelerator with latex of synthetic polyisoprene that is synthetic rubber as a composition for dip molding. However, the technique of Patent Document 1 can prevent the onset of immediate allergy (Type I) due to proteins derived from natural rubber, whereas it may sometimes cause allergic symptoms of delayed allergy (Type IV), when the latex composition is famed as a dip-molded product and contacts with human bodies, due to the vulcanization accelerator contained in the dip-molded product.

RELATED ART DOCUMENTS

Patent Documents

Patent Document 1: International Publication No. WO 2014/129547

SUMMARY OF THE INVENTION

Problem to be Solved by the Invention

The present invention has been made in consideration of such circumstances. The present invention aims to provide a xanthogen compound dispersion that is capable of suppressing onset of symptoms of delayed allergy (Type IV) in addition to immediate allergy (Type I) and can provide a molded film such as a dip-molded product having high tear strength and excellent stability of tear strength, and in which occurrence of a pinhole is effectively suppressed, when used as a vulcanization accelerator of a polymer such as a conjugated diene polymer and famed into a molded film such as a dip-molded product. Further, the present invention aims to provide a conjugated diene polymer latex composition obtained by using such a xanthogen compound dispersion and a molded film such as a dip-molded product obtained by using such a conjugated diene polymer latex composition.

Means for Solving the Problem

The present inventors have intensively studied to solve the above problem. As a result, it has been found that the above problem can be solved by a xanthogen compound dispersion obtained by dispersing a xanthogen compound having a volume average particle size of 0.001 to 9 µm in water or alcohol. Based on such findings, the present inventors have completed the present invention.

The present invention provides a xanthogen compound dispersion famed by dispersing a xanthogen compound in water or alcohol, a volume average particle size of the xanthogen compound being 0.001 to 9 µm.

The xanthogen compound dispersion according to the present invention preferably further comprises a nonionic surfactant and/or a nonionic anionic surfactant.

In the xanthogen compound dispersion according to the present invention, the nonionic surfactant and/or the nonionic anionic surfactant preferably have a polyoxyalkylene structure.

In the xanthogen compound dispersion according to the present invention, a 95% cumulative volume particle size (D95) of the xanthogen compound is preferably 0.1 to 43 µm.

In the xanthogen compound dispersion according to the present invention, the xanthogen compound is preferably a xanthate, more preferably a metallic salt of xanthic acid, and more preferably a zinc salt of xanthic acid.

Further, the present invention provides a conjugated diene polymer latex composition comprising a latex of a conjugated diene polymer, a vulcanizing agent, and the above xanthogen compound dispersion according to the present invention.

Furthermore, the present invention provides a molded film comprising the conjugated diene polymer latex composition according to the present invention and a dip-molded product formed by dip-molding the conjugated diene polymer latex composition according to the present invention.

Effects of Invention

The present invention can provide a xanthogen compound dispersion that is capable of suppressing onset of symptoms of delayed allergy (Type IV) in addition to immediate allergy (Type I) and can provide a molded film such as a dip-molded product having high tear strength and excellent stability of tear strength, and in which occurrence of a pinhole is effectively suppressed, when used as a vulcanization accelerator of a polymer such as a conjugated diene polymer and famed into a molded film such as a dip-molded product. Further, the present invention can provide a conjugated diene polymer latex composition obtained by using such a xanthogen compound dispersion and a molded film such as a dip-molded product obtained by using such a conjugated diene polymer latex composition.

DESCRIPTION OF EMBODIMENTS

<Xanthogen Compound Dispersion>

A xanthogen compound dispersion of the present invention is famed by dispersing a xanthogen compound in water or alcohol, and a volume average particle size of the xanthogen compound is 0.001 to 9 μm.

The xanthogen compound used in the present invention is not specifically limited, but examples thereof include a xanthic acid, a xanthate, and the like.

The xanthate is not specifically limited, as long as it is a salt compound having a xanthate structure. A metallic salt of xanthic acid is preferable, and a compound represented by a general formula (ROC(=S)S)x-Z (where R represents a linear or branched hydrocarbon, Z represents a metal atom, and x represents a numerical value that matches the valence of Z and is generally 1 to 4, preferably 2 to 4, particularly preferably 2) is suitable. Among the metallic salts of xanthic acid, a zinc salt of xanthic acid is more preferable.

The xanthate represented by the formula (ROC(=S)S)x-Z above is not specifically limited, but examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl xanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, isopropyl xanthates and butyl xanthates may be employed. The xanthate with x in the formula (ROC(=S)S)x-Z above being 2 or more is preferable, diisopropyl xanthates and dibutyl xanthates are more preferable, zinc diisopropyl xanthate and zinc dibutyl xanthate are still more preferable, and zinc diisopropyl xanthate is particularly preferable. One of these xanthates may be used alone, or two or more of them may be used in combination.

These xanthogen compounds may be used as a single type alone or as two or more types in combination.

The xanthogen compound used in the present invention is a compound that acts as a vulcanization accelerator. Therefore, the xanthogen compound dispersion of the present invention can be suitably used as a vulcanization accelerator of a polymer such as a conjugated diene polymer. The xanthogen compound acts as a vulcanization accelerator in vulcanization and is decomposed into an alcohol, carbon disulfide, and the like after the vulcanization due to heat and the like generated during the vulcanization. Since the alcohol, carbon disulfide, and the like generated by decomposition are usually volatilized by the heat and the like generated during the vulcanization, the residual amount of the xanthogen compound in the obtained vulcanized product of polymer such as a conjugated diene polymer can be suppressed. Therefore, according to the present invention, a content of material causing allergy in the obtained vulcanized product of polymer such as a conjugated diene polymer (e.g., a molded film such as a dip-molded product) can be reduced by using the xanthogen compound dispersion according to the present invention without using a vulcanization accelerator (e.g., a thiuram-based vulcanization accelerator, a dithiocarbamate-based vulcanization accelerator, a thiazole-based vulcanization accelerator, and the like) that has conventionally caused the onset of symptoms of the delayed allergy (Type IV). As a result, in addition to the immediate allergy (Type I), the onset of symptoms of the delayed allergy (Type IV) can be suppressed.

The xanthogen compound dispersion of the present invention is obtained by dispersing the xanthogen compound in a particulate or powdery form. A volume average particle size of the xanthogen compound dispersed in the xanthogen compound dispersion is in the range of 0.001 to 9 μm. In the present invention, by setting the volume average particle size of the xanthogen compound dispersed in the xanthogen compound dispersion in the range of 0.001 to 9 μm, it can provide a molded film such as a dip-molded product having high tear strength and excellent stability of tear strength, and in which occurrence of a pinhole is effectively suppressed, when used as a vulcanization accelerator of a polymer such as a conjugated diene polymer and foiled into a molded film such as a dip-molded product.

The volume average particle size of the xanthogen compound dispersed in the xanthogen compound dispersion may be in the range of 0.001 to 9 μm, preferably in the range of 0.05 to 9 μm, more preferably in the range of 0.05 to 7 μm, and still more preferably in the range of 0.07 to 5 μm. When the volume average particle size of the xanthogen compound dispersed in the xanthogen compound dispersion is too small, it becomes difficult to uniformly disperse the xanthogen compound in water or alcohol as a dispersion medium. Therefore, a desired characteristic may not be obtained. On the other hand, when the volume average particle size is too large, the obtained molded film such as a dip-molded product has low tear strength and inferior stability of the tear strength, and the occurrence of a pinhole is not insufficiently suppressed. In addition, when the volume average particle size is too large, time of aging (pre-vulcanization) required to realize the desired tear strength becomes long, resulting in inferior productivity.

In the present invention, it is sufficient that the volume average particle size of the xanthogen compound dispersed in the xanthogen compound dispersion is within the above range. It is preferable that a 95% cumulative volume particle size (D95) of the xanthogen compound is in the range of 0.1 to 43 μm, more preferably in the range of 0.1 to 40 μm, still more preferably in the range of 0.1 to 35 μm, and particularly preferably in the range of 0.1 to 20 μm. By setting the 95% cumulative volume particle size (D95) within the above range, the effect of improving the tear strength and the stability of the tear strength and the effect of suppressing the occurrence of a pinhole can be further enhanced. The volume average particle size and the 95% cumulative volume particle size (D95) of the xanthogen compound can be measured by using, for example, a laser diffraction/scattering particle size distribution measuring instrument.

The content ratio of the xanthogen compound in the xanthogen compound dispersion of the present invention is preferably 1 to 60 wt %, more preferably 10 to 50 wt %, and still more preferably 30 to 50 wt %, with respect to the entire xanthogen compound dispersion. By setting the content ratio of the xanthogen compound within the above range, the xanthogen compound dispersion can have more excellent storage stability.

In addition, the xanthogen compound dispersion of the present invention preferably further comprises a nonionic surfactant and/or a nonionic anionic surfactant in addition to the xanthogen compound described above.

According to the present invention, the xanthogen compound can be dispersed more suitably by dispersing the xanthogen compound mentioned above together with the nonionic surfactant and/or the nonionic anionic surfactant in water or alcohol. As a result, an effect of the xanthogen compound as a vulcanization accelerator can be further enhanced and vulcanization time (in particular, time required for aging (pre-vulcanization)) when obtaining a vulcanized product of a polymer such as a conjugated diene polymer can be shortened, resulting in improvement of the productivity. In the present invention, at least one of the nonionic surfactant and the nonionic anionic surfactant is preferably used, and it is more preferable to use the nonionic surfactant.

The nonionic surfactant may be any nonionic surfactant, and is not particularly limited. Examples of the nonionic surfactant include polyoxyalkylene glycol, polyoxyalkylene alkyl ether, polyoxyalkylene alkyl phenyl ether, polyoxyethylene styrenated phenyl ether, polyoxyethylene (hydrogenated) castor oil, polyoxyethylene alkylamine, fatty acid alkanolamide, and the like.

Examples of the polyoxyalkylene glycol include polyoxyethylene glycol, polyoxypropylene glycol, polyoxypropylene glycol ethylene oxide adducts such as polyoxyethylene polyoxypropylene glycol, and the like.

Examples of the polyoxyalkylene alkyl ethers include linear or branched ethers to which 1 to 50 (preferably 1 to 10) of propylene oxides and/or ethylene oxides are added. Among these, linear or branched ethers to which 1 to 50 (preferably 1 to 10) of propylene oxides are added, linear or branched ethers to which 1 to 50 (preferably 1 to 10) of ethylene oxides are added, and linear or branched ethers to which 2 to 50 (preferably 2 to 10) of ethylene oxides and propylene oxides are added by block polymerization or random polymerization may be mentioned, and polyoxyethylene dodecyl ether, polyoxyethylene lauryl ether, and the like may be mentioned.

Examples of the polyoxyalkylene alkylphenyl ether include a compound obtained by adding 1 to 50 (preferably 1 to 10) of propylene oxides and/or ethylene oxides to an alkylphenol.

Examples of the polyoxyethylene styrenated phenyl ether include ethylene oxide adducts of (mono, di, and tri) styreneized phenols. Among them, polyoxyethylene distyrenated phenyl ether is preferred, which is an ethylene oxide adduct of a distyrenated phenol.

Examples of the polyoxyethylene (hydrogenated) castor oil include ethylene oxide adducts of castor oil or hydrogenated castor oil.

Examples of the fatty acid alkanolamide include lauric acid diethanolamide, palmitic acid diethanolamide, myristic acid diethanolamide, stearic acid diethanolamide, oleic acid diethanolamide, palm oil fatty acid diethanolamide, coconut oil fatty acid diethanolamide, and the like.

Among the nonionic surfactants, a nonionic surfactant having a polyoxyalkylene structure is preferred, a nonionic surfactant having a polyoxyethylene structure is more preferred, a hydrocarbylated ether of polyoxyethylene is more preferred, a polyoxyalkylene alkyl ether and a polyoxyethylene distyrenated phenyl ether are still more preferred, and polyoxyethylene distyrenated phenyl ether is particularly preferred. The nonionic surfactants may be used as a single type alone or as two or more types in combination.

The nonionic anionic surfactant may be any anionic surfactant (i.e., a substance whose anionic moiety exhibits surface activity through ionic dissociation in an aqueous solution) having a segment that acts as a nonionic surfactant in its main molecular chain (e.g., a polyalkylene oxide chain), and is not particularly limited.

Examples of such a nonionic anionic surfactant include a compound represented by the following general formula (1).

$$R^1\text{—}O\text{—}(CR^2R^3CR^4R^5)_n\text{—}SO_3M \qquad (1)$$

(In the general formula (1) above, $R^1$ is an alkyl group having 6 to 16 carbon atoms or an aryl group having 6 to 14 carbon atoms which may be substituted with an alkyl group having 1 to 25 carbon atoms; $R^2$ to $R^5$ are groups each independently selected from the group consisting of hydrogen and a methyl group; M is an alkali metal atom or an ammonium ion; and n is 3 to 40.)

Specific examples of the nonionic anionic surfactant include polyoxyethylene alkyl ether sulfates such as a polyoxyethylene lauryl ether sulfate, a polyoxyethylene cetyl ether sulfate, a polyoxyethylene stearyl ether sulfate, and a polyoxyethylene oleyl ether sulfate; polyoxyethylene aryl ether sulfates such as a polyoxyethylene nonylphenyl ether sulfate, a polyoxyethylene octylphenyl ether sulfate, and a polyoxyethylene distyryl ether sulfate; and the like.

Among the nonionic anionic surfactants, a nonionic anionic surfactant having a polyoxyalkylene structure is preferred, and a nonionic anionic surfactant having a polyoxyethylene structure is more preferred. The nonionic anionic surfactants may be used as a single type alone or as two or more types in combination.

In the xanthogen compound dispersion of the present invention, the content of the nonionic surfactant and/or the nonionic anionic surfactant is not particularly limited, but is preferably 0.1 to 30 parts by weight, more preferably 1 to 20 parts by weight, still more preferably 4 to 15 parts by weight, particularly preferably 5.5 to 9.5 parts by weight, with respect to 100 parts by weight of the xanthogen compound. By setting the content of the nonionic surfactant and/or the nonionic anionic surfactant within the above range, dispersibility of the xanthogen compound can be further increased in the xanthogen compound dispersion, and thereby, the effect of shortening the vulcanization time when obtaining a vulcanized product of a polymer such as conjugated diene polymer is further enhanced.

The method for producing the xanthogen compound dispersion of the present invention is not particularly limited, but a method is preferred in which a xanthogen compound and a nonionic surfactant and/or a nonionic anionic surfactant used as required are mixed with water or alcohol (e.g., at least one selected from methanol, ethanol, propanol and butanol), and then a pulverizing process is performed on the obtained mixed liquid. In particular, it is preferable to set the volume average particle size of the xanthogen compound within the above range by adjusting a condition of the pulverizing process. The pulverizing process is not particularly limited as long as it is a process capable of crushing the xanthogen compound and suppressing aggregation of the xanthogen compound contained in the dispersion. Examples of the pulverizing process include a method of using a known pulverizer such as a method of using a pulverizer utilizing shearing action or grinding action, and a method of using a stirring type pulverizer. Specifically, pulverizers such as a roll mill, a hammer mill, an oscillating mill, a jet mill, a ball mill, a planetary ball mill, a bead mill, a sand mill, a three-roll mill can be used. Among these, from the viewpoint that the volume average particle size of the xanthogen compound in the dispersion can be suitably controlled, a method for performing the pulverizing process by using a ball mill, a planetary ball mill, or a bead mill is suitable.

For example, when the pulverizing process is performed by using a ball mill, it is preferable to perform the pulverizing process by using a media having a media size of preferably φ5 to φ50 nut, more preferably φ10 to φ35 mm with a rotating speed of preferably 10 to 300 rpm, more preferably 10 to 100 rpm, and a treatment time of preferably 24 to 120 hours, more preferably 24 to 72 hours. When the pulverizing process is performed by using a planetary ball mill, it is preferable to perform the pulverizing process by using a media having a media size of preferably φ0.1 to φ5 mm, more preferably φ0.3 to φ3 mm with a rotating speed of preferably 100 to 1000 rpm, more preferably 100 to 500 rpm, and a treatment time of preferably 0.25 to 5 hours, more preferably 0.25 to 3 hours. When the pulverizing process is performed by using a bead mill, it is preferable to perform the pulverizing process by using a media having a media size of preferably φ0.1 to φ3 mm, more preferably φ0.1 to φ1 mm with a rotating speed of preferably from 1000 to 10000 rpm, more preferably from 1000 to 5000 rpm, and a treatment time of preferably 0.25 to 5 hours, more preferably 0.25 to 3 hours.

<Conjugated Diene Polymer Latex Composition>

The conjugated diene polymer latex composition of the present invention comprises a latex of a conjugated diene polymer, a vulcanizing agent, and the aforementioned xanthogen compound dispersion of the present invention.

The conjugated diene polymer constituting the latex of the conjugated diene polymer is not particularly limited, and examples thereof include synthetic polyisoprene, a styrene-isoprene-styrene block copolymer (SIS), natural rubber with proteins removed, a nitrile group-containing conjugated diene copolymer, and the like. Among these, those containing an isoprene unit such as synthetic polyisoprene, an SIS, and natural rubber with proteins removed are preferred, and synthetic polyisoprene is particularly preferred. The conjugated diene polymer may be a carboxy-modified conjugated diene polymer obtained by modifying with a monomer having a carboxyl group.

In the case of using a synthetic polyisoprene as the conjugated diene polymer, the synthetic polyisoprene may be an isoprene homopolymer or may be a copolymer of isoprene with another ethylenically unsaturated monomer that is copolymerizable with isoprene. The content of isoprene units in the synthetic polyisoprene is preferably 70 wt % or more, more preferably 90 wt % or more, further preferably 95 wt % or more, particularly preferably 100 wt % (homopolymer of isoprene) with respect to all monomer units, for ease of obtaining a molded film such as dip-molded product that is flex and has excellent tensile strength.

Examples of the other ethylenically unsaturated monomers that are copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrene; and ethylenically unsaturated carboxylic acid ester monomers such as methyl (meth)acrylate (which means "methyl acrylate and/or methyl methacrylate", and the same hereinafter applies to ethyl (meth)acrylate and the like), ethyl (meth) acrylate, butyl (meth)acrylate, and (meth)acrylic acid-2-ethylhexyl. One of these other ethylenically unsaturated monomers that are copolymerizable with isoprene may be used alone, or a plurality of them may be used in combination.

The synthetic polyisoprene can be obtained by a conventionally known method, for example, by solution polymerization of isoprene with other ethylenically unsaturated copolymerizable monomers used as required, in an inert polymerization solvent, using a Ziegler polymerization catalyst composed of trialkylaluminum-titanium tetrachloride or an alkyl lithium polymerization catalyst such as n-butyl lithium and sec-butyl lithium. The polymer solution of the synthetic polyisoprene obtained by the solution polymerization may be used as it is for producing the synthetic polyisoprene latex but can be used also for producing the synthetic polyisoprene latex by extracting a solid synthetic polyisoprene from the polymer solution and thereafter dissolving it in an organic solvent. In the case where a polymer solution of synthetic polyisoprene is obtained by the aforementioned method, impurities such as residues of a polymerization catalyst remaining in the polymer solution may be removed. Further, an anti-aging agent, which will be described below, may be added into the solution during the polymerization or after the polymerization. Further, a commercially available solid synthetic polyisoprene also can be used.

There are four types of the isoprene units in the synthetic polyisoprene, depending on the bonding state of isoprene, which are cis bond units, trans bond units, 1,2-vinyl bond units, and 3,4-vinyl bond units. For improving the tensile strength of the obtained molded film such as a dip-molded product, the content proportion of the cis bond units in the isoprene units contained in the synthetic polyisoprene is preferably 70 wt % or more, more preferably 90 wt % or more, further preferably 95 wt % or more, with respect to all isoprene units.

The weight-average molecular weight of the synthetic polyisoprene is preferably 10,000 to 5,000,000, more preferably 500,000 to 5,000,000, further preferably 800,000 to 3,000,000, in terms of standard polystyrene by gel permeation chromatography. Adjusting the weight-average molecular weight of the synthetic polyisoprene to the aforementioned range tends to improve the tensile strength of the molded film such as a dip-molded product and facilitate the production of the synthetic polyisoprene latex.

Further, the polymer/Mooney viscosity at 100° C.) of the synthetic polyisoprene is preferably 50 to 85, more preferably 60 to 85, further preferably 70 to 85.

As a method for obtaining a synthetic polyisoprene latex, there are (1) a method for producing a synthetic polyisoprene latex by emulsifying a solution or a microsuspension of a synthetic polyisoprene dissolved or finely dispersed in an organic solvent, in water in the presence of an anionic surfactant, followed by removal of the organic solvent, as required, and (2) a method for directly producing a synthetic polyisoprene latex by emulsion polymerization or suspension polymerization of isoprene alone or a mixture of isoprene with an ethylenically unsaturated monomer that is copolymerizable with isoprene, in the presence of an anionic surfactant. The aforementioned production method (1) is preferable since the synthetic polyisoprene with cis bond units at a high proportion in the isoprene units can be used, and a molded film such as a dip-molded product having excellent mechanical properties such as tensile strength is easily obtained.

Examples of the organic solvent used in the aforementioned production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; and halogenated hydrocarbon solvents such as methylene chloride, chloroform, and ethylene dichloride. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, further preferably 500 to 1,500, with respect to 100 parts by weight of the synthetic polyisoprene.

Examples of the anionic surfactants to be used in the aforementioned production method (1) include fatty acid salts such as sodium laurate, potassium myristate, sodium palmitate, potassium oleate, sodium linolenate, and sodium rosinate; alkylbenzenesulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; and monoalkyl phosphates such as sodium lauryl phosphate and potassium lauryl phosphate.

Among these anionic surfactants, fatty acid salts, alkylbenzenesulfonates, alkyl sulfosuccinates, alkyl sulfate ester salts, and polyoxyethylene alkyl ether sulfate ester salts are preferable, and fatty acid salts and alkylbenzenesulfonates are particularly preferable.

Further, use of at least one selected from the group consisting of alkylbenzenesulfonates, alkyl sulfosuccinates, alkyl sulfate ester salts, and polyoxyethylene alkyl ether sulfate ester salts in combination with fatty acid salts is preferable, and use of alkylbenzenesulfonates in combination with fatty acid salts is particularly preferable, because a slight amount of the residual polymerization catalyst (particularly, aluminum and titanium) derived from the synthetic polyisoprene can be more efficiently removed and generation of aggregates is suppressed in the production of the conjugated diene polymer latex composition. Here, as fatty acid salts, sodium rosinate and potassium rosinate are preferable, and as alkylbenzenesulfonates, sodium dodecylbenzenesulfonate and potassium dodecylbenzenesulfonate are preferable. Further, one of these surfactants may be used alone, or two or more of them may be used in combination.

As described above, use of at least one selected from the group consisting of alkylbenzenesulfonates, alkyl sulfosuccinates, alkyl sulfate ester salts, and polyoxyethylene alkyl ether sulfate ester salts in combination with fatty acid salts allows the obtained latex to contain the at least one selected from alkylbenzenesulfonates, alkyl sulfosuccinates, alkyl sulfate ester salts, and polyoxyethylene alkyl ether sulfate ester salts, and fatty acid salts.

Further, in the aforementioned production method (1), surfactants other than the anionic surfactants may be used in combination, and examples of the surfactants other than the anionic surfactants include copolymerizable surfactants such as sulfoesters of $\alpha,\beta$-unsaturated carboxylic acids, sulfate esters of $\alpha,\beta$-unsaturated carboxylic acids, sulfoalkyl aryl ethers.

The amount of anionic surfactants to be used in the aforementioned production method (1) is preferably 0.1 to 50 parts by weight, more preferably 0.5 to 30 parts by weight, with respect to 100 parts by weight of the synthetic polyisoprene. In the case of using two or more surfactants, the total amount of the surfactants to be used preferably falls within the aforementioned range. That is, for example, in the case of using at least one selected from alkylbenzenesulfonates, alkyl sulfosuccinates, alkyl sulfate ester salts, and polyoxyethylene alkyl ether sulfate ester salts in combination with fatty acid salts, the total amount of these surfactants to be used preferably falls within the aforementioned range. An excessively small amount of the anionic surfactants used may possibly cause a large amount of aggregates in emulsification, or conversely, an excessively large amount thereof facilitates foaming and may possibly cause pinholes in the obtained molded film such as a dip-molded product.

Further, in the case of using at least one selected from alkylbenzenesulfonates, alkyl sulfosuccinates, alkyl sulfate ester salts, and polyoxyethylene alkyl ether sulfate ester salts in combination with fatty acid salts as anionic surfactants, the ratio of these surfactants to be used is preferably adjusted to a range of 1:1 to 10:1, more preferably to a range of 1:1 to 7:1, as a weight ratio of "fatty acid salts":"total of at least one surfactant selected from alkylbenzenesulfonates, alkyl sulfosuccinates, alkyl sulfate ester salts, and polyoxyethylene alkyl ether sulfate ester salts". An excessively large ratio of the at least one surfactant selected from alkylbenzenesulfonates, alkyl sulfosuccinates, alkyl sulfate ester salts, and polyoxyethylene alkyl ether sulfate ester salts to be used may possibly cause intense foaming when handling the synthetic polyisoprene, thereby making operations such as long-term standing and addition of a defoamer necessary, which may possibly lead to a decrease in workability and an increase in cost.

The amount of water to be used in the aforementioned production method (1) is preferably 10 to 1,000 parts by weight, more preferably 30 to 500 parts by weight, most preferably 50 to 100 parts by weight, with respect to 100 parts by weight of the organic solvent solution of the synthetic polyisoprene. Examples of the type of water to be used include hard water, soft water, deionized water, distilled water, zeolite water and the like, and soft water, deionized water, and distilled water are preferable.

As the device that emulsifies the solution or the microsuspension of the synthetic polyisoprene dissolved or finely dispersed in the organic solvent, in water, in the presence of anionic surfactants, devices that are commercially available in general as emulsifying machines or dispersers can be used without specific limitation. The method for adding the anionic surfactants to the solution or the microsuspension of the synthetic polyisoprene is not specifically limited, and the anionic surfactants may be added in advance to either water, or the solution or the microsuspension of the synthetic polyisoprene, or both of them, or may be added in a lump or dividedly to the emulsified liquid during the emulsification operation.

Examples of the emulsifying device include batch emulsifying machines such as the product name "Homogenizer" (manufactured by IKA Works), the product name "POLYTRON" (manufactured by Kinematica AG), and the product name "TK AUTO-HOMO MIXER" (manufactured by Tokushu Kika Kogyo Co., Ltd.); continuous emulsifying machines such as the product name "TK PIPELINE-HOMO MIXER" (manufactured by Tokushu Kika Kogyo Co., Ltd.), the product name "Colloid mill" (manufactured by Shinko Pantec Co., Ltd.), the product name "SLASHER" (manufactured by NIPPON COKE & ENGINEERING CO., LTD.), the product name "Trigonal wet grinder" (manufactured by Mitsui Miike Chemical Engineering Machinery, Co., Ltd.), the product name "CAVITRON" (manufactured by Eurotec, Ltd.), the product name "MILDER" (manufactured by Pacific Machinery & Engineering Co., Ltd.), and the product name "FINE FLOW MILL" (manufactured by Pacific Machinery & Engineering Co., Ltd.); high-pressure emulsifying machines such as the product name "Microfluidizer" (manufactured by MIZUHO INDUSTRIAL CO., LTD.), the product name "NANOMIZER" (manufactured by NANOMIZER Inc.), and the product name "APV GAULIN" (manufactured by Manton-Gaulin Company); membrane emulsifying machines such as the product name "Membrane emulsifying machine" (manufactured by REICA Co., Ltd.); vibratory emulsifying machines such as the product name "VIBROMIXER" (manufactured by REICA Co., Ltd.); and ultrasonic emulsifying machines such as the product name "Ultrasonic homogenizer" (manufactured by Branson Ultrasonics Corporation). The conditions for the emulsification operation by such emulsifying devices are not specifically limited, and the processing temperature, the processing time, and the like, may be appropriately determined so that a desired dispersion state is achieved.

In the aforementioned production method (1), the organic solvent is desirably removed from the emulsion obtained by the emulsification operation. As the method for removing the organic solvent from the emulsion, methods that can reduce the content of the organic solvent (preferably, an alicyclic hydrocarbon solvent) in the obtained synthetic polyisoprene latex to 500 weight ppm or less are preferable, and methods such as vacuum distillation, normal pressure distillation, water vapor distillation, and centrifugation can be employed, for example.

In the aforementioned method (1), the organic solvent is desirably removed from the emulsion obtained by the aforementioned emulsification operation, to obtain a synthetic polyisoprene latex. The method for removing the organic solvent from the emulsion is not specifically limited as long as it is a method that can reduce the total content of the alicyclic hydrocarbon solvent and the aromatic hydrocarbon solvent as organic solvents in the obtained synthetic polyisoprene latex to 500 weight ppm or less, and methods such as vacuum distillation, normal pressure distillation, water vapor distillation, and centrifugation can be employed therefor.

Further, concentration operation may be applied, as needed, by a method such as vacuum distillation, normal pressure distillation, centrifugation, and membrane concentration, after the removal of organic solvents, in order to increase the solid content concentration of the synthetic polyisoprene latex. Centrifugation is particularly preferably performed, since the solid content concentration of the synthetic polyisoprene latex can be increased, and the amount of the surfactants remaining in the synthetic polyisoprene latex can be reduced.

The centrifugation is preferably performed, for example, using a continuous centrifuge, under the conditions in which the centrifugal force is preferably 100 to 10,000 G, the solid content concentration of the synthetic polyisoprene latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. Further, the amount of the surfactants remaining in the synthetic polyisoprene latex can be thereby reduced.

The solid content concentration of the synthetic polyisoprene latex is preferably 30 to 70 wt %, more preferably 40 to 70 wt %. When the solid content concentration is excessively low, the solid content concentration of the conjugated diene polymer latex composition decreases, and therefore the film thickness of the obtained molded film such as the dip-molded product decreases, so that the molded film easily breaks. Conversely, when the solid content concentration is excessively high, the viscosity of the synthetic polyisoprene latex increases, so that transfer through a pipe or stirring within a preparation tank may be made difficult in some cases.

The volume average particle size of the synthetic polyisoprene latex is preferably 0.1 to 10 µm, more preferably 0.5 to 3 µm, further preferably 0.5 to 2.0 µm. Adjusting the volume average particle size to the aforementioned range can make the latex viscosity appropriate to facilitate handling and can suppress formation of a film on the surface of the latex during storage of the synthetic polyisoprene latex.

Further, the synthetic polyisoprene latex may contain additives that are generally contained in the field of latex, such as pH adjusters, defoamers, preservatives, crosslinking agents, chelating agents, oxygen scavengers, dispersants, and anti-aging agents. Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxides and ammonia are preferable.

Further, as described above, a styrene-isoprene-styrene block copolymer (SIS) can also be used as the conjugated diene polymer. In the SIS, the character "S" represents a styrene block, and the character "I" represents an isoprene block.

The SIS can be obtained by conventionally known methods such as block copolymerization of isoprene and styrene in an inert polymerization solvent using an active organic metal such as n-butyl lithium as an initiator. The polymer solution of the obtained SIS may be used as it is for producing the SIS latex but can be used for producing the SIS latex by extracting a solid SIS from the polymer solution and thereafter dissolving the solid SIS in an organic solvent. The method for producing the SIS latex is not specifically limited, but a method for producing SIS latex by emulsifying, in water, a solution or a microsuspension of a SIS that is dissolved or finely dispersed in an organic solvent in the presence of a surfactant and removing the organic solvent as required is preferable. At this time, impurities such as the residue of the polymerization catalyst remaining in the polymer solution after the synthesis may be removed. Further, an anti-aging agent, which will be described below, may be added into the solution during the polymerization or after the polymerization. Further, a commercially available solid SIS also can be used.

As the organic solvent, the same organic solvent as that for the aforementioned synthetic polyisoprene can be used, and aromatic hydrocarbon solvents and alicyclic hydrocarbon solvents are preferable, and cyclohexane and toluene are particularly preferable. The amount of the organic solvent to be used is generally 50 to 2,000 parts by weight, preferably 80 to 1,000 parts by weight, more preferably 100 to 500 parts by weight, further preferably 150 to 300 parts by weight, with respect to 100 parts by weight of the SIS.

As the surfactants, the same surfactants as described above for the aforementioned synthetic polyisoprene can be mentioned, for example. Anionic surfactants are suitable, and sodium rosinate, and sodium dodecylbenzene sulfonate are particularly preferable.

The amount of surfactants to be used is preferably 0.1 to 50 parts by weight, more preferably 0.5 to 30 parts by weight, with respect to 100 parts by weight of the SIS. When this amount is excessively small, the stability of the latex tends to be poor. Conversely, when the amount is excessively large, foaming easily occurs, which may possibly cause a problem in dip molding.

The amount of water to be used in the aforementioned method for producing the SIS latex is preferably 10 to 1,000 parts by weight, more preferably 30 to 500 parts by weight, most preferably 50 to 100 parts by weight, with respect to 100 parts by weight of the organic solvent solution of the SIS. Examples of the type of water to be used include hard water, soft water, deionized water, distilled water, and zeolite water and the like. Further, polar solvents typified by alcohols such as methanol may be used in combination with water.

As a method for adding monomers, the same methods as described above for the aforementioned synthetic polyisoprene can be mentioned, for example. As a device that emulsifies an organic solvent solution or a microsuspension of SIS in water in the presence of a surfactant, the same devices as described above for the aforementioned synthetic polyisoprene can be mentioned, for example. The method for adding the surfactants is not specifically limited, and the surfactants may be added in advance to either water, or the organic solvent solution or the microsuspension of the SIS, or both of them, or may be added to the emulsified liquid during the emulsification operation at one time or several times.

In the aforementioned method for producing a SIS latex, the SIS latex is preferably obtained by removing the organic solvent from the emulsion obtained by the emulsification operation. The method for removing the organic solvent from the emulsion is not specifically limited, and methods such as vacuum distillation, normal pressure distillation, water vapor distillation, and centrifugation can be employed.

Further, in order to increase the solid content concentration of the SIS latex, concentration operation may be applied after the removal of the organic solvent, as needed, by methods such as vacuum distillation, normal pressure distillation, centrifugation, and membrane concentration.

The solid content concentration of the SIS latex is preferably 30 to 70 wt %, more preferably 50 to 70 wt %. When the solid content concentration is excessively low, the solid content concentration of the conjugated diene polymer latex composition decreases, and therefore the film thickness of the molded film such as the dip-molded product decreases, so that the molded film easily breaks. Conversely, when the solid content concentration is excessively high, the viscosity of the SIS latex increases, so that transfer through a pipe or stirring within a preparation tank is made difficult.

Further, the SIS latex may contain additives that are generally contained in the field of latex, such as pH adjusters, defoamers, preservatives, crosslinking agents, chelating agents, oxygen scavengers, dispersants, and anti-aging agents. As the pH adjusters, the same pH adjusters as described above for the synthetic polyisoprene can be mentioned, and alkali metal hydroxides and ammonia are preferable.

The content of styrene units in the styrene block of the SIS contained in the thus obtained SIS latex is preferably 70 to 100 wt %, more preferably 90 to 100 wt %, further preferably 100 wt %, with respect to all monomer units. Further, the content of isoprene units in the isoprene block of the SIS is preferably 70 to 100 wt %, more preferably 90 to 100 wt %, further preferably 100 wt %, with respect to all monomer units.

The content ratio of the styrene units to isoprene units in the SIS is generally in the range of 1:99 to 90:10, preferably 3:97 to 70:30, more preferably 5:95 to 50:50, further preferably 10:90 to 30:70, as a weight ratio of "styrene units: isoprene units".

The weight-average molecular weight of the SIS is preferably 10,000 to 1,000,000, more preferably 50,000 to 500,000, further preferably 100,000 to 300,000, in tams of standard polystyrene by gel permeation chromatography. Adjusting the weight-average molecular weight of the SIS to the aforementioned range tends to improve the balance of the tensile strength and the flexibility of the molded film such as a dip-molded product and facilitate the production of the SIS latex.

The volume average particle size of the latex particles (SIS particles) in the SIS latex is preferably 0.1 to 10 μm, more preferably 0.5 to 3 μm, further preferably 0.5 to 2.0 μm. Adjusting the volume average particle size of the latex particles to the aforementioned range makes the latex viscosity appropriate to facilitate handling and can suppress formation of a film on the surface of the latex during storage of the SIS latex.

Further, natural rubber with proteins removed can also be used as the conjugated diene polymer. Natural rubber contained in latex obtained from a natural rubber tree and natural rubber contained in latex famed by treating the aforementioned latex can be used for natural rubber as raw material of the natural rubber with proteins removed. For example, natural rubber contained in field latex collected from a natural rubber tree, natural rubber contained in commercially available natural rubber latex formed by treating field latex with ammonia, etc., and the like, can be used therefor.

When obtaining the natural rubber with proteins removed, a method for removing a protein from natural rubber is not particularly limited. A latex of natural rubber with proteins removed can be obtained by reacting an urea compound with a natural rubber latex in the presence of a surfactant to modify a protein contained in the natural rubber; subjecting the natural rubber latex containing such a modified protein to a process such as centrifugation, coagulation of a rubber content, or ultrafiltration to separate the modified protein from the natural rubber; and removing this modified protein.

Further, a nitrile group-containing conjugated diene copolymer can also be used as the conjugated diene polymer, as described above.

The nitrile group-containing conjugated diene copolymer is a copolymer famed by copolymerization of ethylenically unsaturated nitrile monomers with conjugated diene monomers and may be a copolymer famed by copolymerization of the aforementioned monomers with other ethylenically unsaturated monomers that are copolymerizable with the aforementioned monomers and are used, as required, in addition to the aforementioned monomers.

Examples of the conjugated diene monomers include 1,3-butadiene, isoprene, 2,3-dimethyl-1,3-butadiene, 2-ethyl-1,3-butadiene, 1,3-pentadiene, chloroprene, and the like. Among these, 1,3-butadiene and isoprene are preferable, and 1,3-butadiene is more preferable. One of these conjugated diene monomers can be used alone, or two or more of them can be used in combination. The content proportion of conjugated diene monomer units famed by the conjugated diene monomers in the nitrile group-containing conjugated diene copolymers is preferably 56 to 78 wt %, more preferably 56 to 73 wt %, further preferably 56 to 68 wt %. Adjusting the content of conjugated diene monomer units to the aforementioned range can allow the obtained molded film such as a dip-molded product to be more excellent in texture and elongation, while having sufficient tensile strength.

The ethylenically unsaturated nitrile monomers are not specifically limited as long as they are ethylenically unsaturated monomers containing a nitrile group, but examples thereof include acrylonitrile, methacrylonitrile, fumaronitrile, α-chloroacrylonitrile, cyanoethylacrylonitrile, and the like. Among these, acrylonitrile and methacrylonitrile are preferable, and acrylonitrile is more preferable. One of these ethylenically unsaturated nitrile monomers can be used alone, or two or more of them can be used in combination. The content proportion of ethylenically unsaturated nitrile monomer units famed by the ethylenically unsaturated nitrile monomers in the nitrile group-containing conjugated diene copolymer is preferably 20 to 40 wt %, more preferably 25 to 40 wt %, further preferably 30 to 40 wt %. Adjusting the content of the ethylenically unsaturated nitrile monomer units to the aforementioned range can allow the obtained molded film such as a dip-molded product to be more excellent in texture and elongation, while having sufficient tensile strength.

Examples of the other ethylenically unsaturated monomers that are copolymerizable with the conjugated diene monomers and the ethylenically unsaturated nitrile monomers include ethylenically unsaturated carboxylic acid monomers that are ethylenically unsaturated monomers containing a carboxyl group; vinyl aromatic monomers such as styrene, alkyl styrene, and vinylnaphthalene; fluoroalkyl vinyl ethers such as fluoroethyl vinyl ether; ethylenically unsaturated amide monomers such as (meth)acrylamide, N-methylol (meth)acrylamide, N,N-dimethylol (meth)acrylamide, N-methoxymethyl (meth)acrylamide, and N-propoxymethyl (meth)acrylamide; ethylenically unsaturated carboxylic acid ester monomers such as methyl (meth)acrylate, ethyl (meth)acrylate, butyl (meth)acrylate, 2-ethylhexyl (meth) acrylate, trifluoroethyl (meth) acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth) acrylate, 2-cyanoethyl (meth) acrylate, 1-cyanopropyl (meth)acrylate, 2-ethyl-6-cyanohexyl (meth) acrylate, 3-cyanopropyl (meth) acrylate, hydroxyethyl (meth)acrylate, hydroxypropyl (meth)acrylate, glycidyl (meth)acrylate, and dimethylaminoethyl (meth)acrylate; crosslinkable monomers such as divinylbenzene, polyethylene glycol di(meth)acrylate, polypropylene glycol di(meth)acrylate, trimethylolpropane tri(meth)acrylate, and pentaerythritol (meth)acrylate; and the like. One of these ethylenically unsaturated monomers can be used alone, or two or more of them can be used in combination. By using the ethylenically unsaturated carboxylic acid monomer as the other ethylenically unsaturated copolymerizable monomer, the nitrile group-containing conjugated diene copolymer having a carboxyl group can be produced.

The ethylenically unsaturated carboxylic acid monomers are not specifically limited as long as they are ethylenically unsaturated monomers containing a carboxyl group, but examples thereof include ethylenically unsaturated monocarboxylic acid monomers such as acrylic acid and methacrylic acid; ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial ester monomers such as monobutyl fumarate, monobutyl maleate, and mono-2-hydroxypropyl maleate; and the like. Among these, ethylenically unsaturated monocarboxylic acid is preferable, and methacrylic acid is particularly preferable. The ethylenically unsaturated carboxylic acid monomers are also used as alkali metallic salts or ammonium salts. Further, one of these ethylenically unsaturated carboxylic acid monomers can be used alone, or two or more of them can be used in combination. The content proportion of ethylenically unsaturated carboxylic acid monomer units famed by the ethylenically unsaturated carboxylic acid monomers in the nitrile group-containing conjugated diene copolymer is preferably 2 to 5 wt %, more preferably 2 to 4.5 wt %, further preferably 2.5 to 4.5 wt %. Adjusting the content of the ethylenically unsaturated carboxylic acid monomer units to the aforementioned range can allow the obtained molded film such as a dip-molded product to be more excellent in texture and elongation, while having sufficient tensile strength.

The content proportion of other monomer units famed by the other ethylenically unsaturated monomers in the nitrile group-containing conjugated diene copolymer is preferably 10 wt % or less, more preferably 5 wt % or less, further preferably 3 wt % or less.

The nitrile group-containing conjugated diene copolymer is obtained by copolymerization of a monomer mixture containing the aforementioned monomers, but a method of copolymerization by emulsion polymerization is preferable. For the emulsion polymerization method, a conventionally known method can be employed.

The number-average particle size of the latex of the nitrile group-containing conjugated diene copolymer is preferably 60 to 300 nm, more preferably 80 to 150 nm. The particle size can be adjusted to a desired value by a method of regulating the amount of the emulsifiers and polymerization initiators to be used, and the like.

As described above, a synthetic polyisoprene, a styrene-isoprene-styrene block copolymer (SIS), natural rubber with proteins removed, a nitrile group-containing conjugated diene copolymer, and the like can be used as the conjugated diene polymer used in the present invention, but there is no limitation to these examples, and a butadiene polymer, a styrene-butadiene copolymer, and the like may be used.

The butadiene polymer may be a homopolymer of 1,3-butadiene as conjugated diene monomers or may be a copolymer famed by copolymerization of 1,3-butadiene as conjugated diene monomers with other ethylenically unsaturated monomers that are copolymerizable with 1,3-butadiene.

Further, the styrene-butadiene copolymer may be a copolymer famed by copolymerization of 1,3-butadiene as conjugated diene monomers with styrene or may be a copolymer famed by copolymerization of the aforementioned monomers with other ethylenically unsaturated monomers that are copolymerizable with the aforementioned monomers and are used, as required, in addition to the aforementioned monomers.

The conjugated diene polymer used in the present invention may be a carboxy-modified conjugated diene polymer. The carboxy-modified conjugated diene polymer can be obtained by modifying the aforementioned conjugated diene polymer with a monomer having a carboxyl group. Note that, when the nitrile group-containing conjugated diene copolymer is obtained by using an ethylenically unsaturated carboxylic acid monomer as another copolymerizable ethylenically unsaturated monomer, the carboxy modification has already been achieved. Therefore, modification with a monomer having a carboxyl group described later is not necessarily required.

The method for modifying the conjugated diene polymer with a monomer having a carboxyl group is not specifically limited, but examples thereof include a method of graft-polymerizing a conjugated diene polymer with a monomer having a carboxyl group in the water phase. The method of graft-polymerizing a conjugated diene polymer with a monomer having a carboxyl group in the water phase is not specifically limited, and a conventionally known method may be used, but a method of adding a monomer having a carboxyl group and an organic peroxide to a conjugated diene polymer latex and thereafter reacting the conjugated diene polymer with the monomer having a carboxyl group in the water phase is preferable, for example.

The organic peroxide is not specifically limited, but examples thereof include diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, benzoyl peroxide, and the like. For improving the mechanical strength of the obtained dip-molded product, 1,1,3,3-tetramethylbutyl hydroperoxide is particularly preferable. One of these organic peroxides may be used alone, or two or more of them may be used in combination.

The amount of the organic peroxide to be added is not specifically limited but is preferably 0.01 to 3 parts by weight, more preferably 0.1 to 1 part by weight, with respect to 100 parts by weight of the conjugated diene polymer contained in the conjugated diene polymer latex.

Further, the organic peroxide can be used as a redox polymerization initiator in combination with a reductant. The reductant is not specifically limited, but examples thereof include compounds containing reduced metal ions such as ferrous sulfate and cuprous naphthenate; sulfinates such as sodium hydroxymethanesulfinate; amine compounds such as dimethyl aniline, and the like. One of these reductants may be used alone, or two or more of them may be used in combination.

The amount of the reductant to be added is not specifically limited but is preferably 0.01 to 1 part by weight with respect to 1 part by weight of the organic peroxide.

The methods for adding the organic peroxide and the reductant are not specifically limited, and known addition methods such as one-time addition, divided addition, and continuous addition can be used.

The reaction temperature when reacting the conjugated diene polymer with the monomer having a carboxyl group is not specifically limited but is preferably 15 to 80° C., more preferably 30 to 50° C. The reaction time when reacting the conjugated diene polymer with the monomer having a carboxyl group may be appropriately set corresponding to the aforementioned reaction temperature but is preferably 30 to 300 minutes, more preferably 60 to 120 minutes.

The solid content concentration of the conjugated diene polymer latex when reacting the conjugated diene polymer with the monomer having a carboxyl group is not specifically limited but is preferably 5 to 60 wt %, more preferably 10 to 40 wt %.

Examples of the monomer having a carboxyl group can include an ethylenically unsaturated monocarboxylic acid monomer such as acrylic acid and methacrylic acid; an ethylenically unsaturated polyvalent carboxylic acid monomer such as itaconic acid, maleic acid, fumaric acid, and butene tricarboxylic acid; a partial ester monomer of an ethylenically unsaturated polyvalent carboxylic acid such as monobutyl fumarate, monobutyl maleate, and mono-2-hydroxypropyl maleate; a polyvalent carboxylic acid anhydride such as maleic anhydride and citraconic anhydride, and the like. An ethylenically unsaturated monocarboxylic acid monomer is preferable, and acrylic acid and methacrylic acid are particularly preferable, for achieving further remarkable effects of the carboxy modification. One of these monomers may be used alone, or two or more of them may be used in combination. Further, the aforementioned carboxyl group includes those in the form of salts with alkali metals, ammonia, and the like.

The amount of the monomer having a carboxyl group to be used is preferably 0.01 part by weight to 100 parts by weight, more preferably 0.01 part by weight to 40 parts by weight, further preferably 0.5 part by weight to 20 parts by weight, with respect to 100 parts by weight of the conjugated diene polymer. Adjusting the amount of the monomer having a carboxyl group to be used to the aforementioned ranges makes the viscosity of the obtained conjugated diene polymer latex composition more appropriate, thereby facilitating transfer and further improving the tensile strength of the obtained molded film such as a dip-molded product.

The method for adding the monomer having a carboxyl group to the conjugated diene polymer latex is not specifically limited, and known addition methods such as one-time addition, divided addition, and continuous addition can be employed.

The modification rate of the carboxy-modified conjugated diene polymer with the monomer having a carboxyl group may be appropriately controlled corresponding to the intended use of the obtained conjugated diene polymer latex composition but is preferably 0.01 to 10 wt %, more preferably 0.2 to 5 wt %, still more preferably 0.3 to 3 wt %, and particularly preferably 0.4 to 2 wt %. The modification rate is represented by the following formula.

$$\text{Modification rate (wt \%)} = (X/Y) \times 100$$

In the formula above, X represents the weight of monomer unit having a carboxyl group in the carboxy-modified conjugated diene polymer, and Y represents the weight of the carboxy-modified conjugated diene polymer, respectively. X can be determined by a method for measuring $^1$H-NMR of a carboxy-modified conjugated diene polymer and calculating X from the result of the $^1$H-HMR measurement; a method for determining an acid amount by neutralization titration and calculating X from the obtained acid amount; and the like.

The polymerization catalyst (graft polymerization catalyst) used for the graft polymerization is not specifically limited, but examples thereof can include inorganic peroxides such as sodium persulfate, potassium persulfate, ammonium persulfate, potassium superphosphate, and hydrogen peroxide; organic peroxides such as diisopropyl benzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; azo compounds such as 2,2'-azobisisobutyronitrile, azobis-2,4-dimethylvaleronitrile, and methyl azobisisobutyrate, and the like. For further improving the tensile strength of the obtained molded film such as a dip-molded product, organic peroxides are preferable, and 1,1,3,3-tetramethylbutyl hydroperoxide is particularly preferable.

One of the aforementioned graft polymerization catalysts can be used alone, or two or more of them can be used in combination. The amount of the graft polymerization catalyst to be used differs depending on the type but is preferably 0.1 to 10 parts by weight, more preferably 0.2 to 5 parts by weight, with respect to 100 parts by weight of the conjugated diene polymer. Further, the method for adding the graft polymerization catalyst is not specifically limited, and known addition methods such as one-time addition, divided addition, and continuous addition can be employed.

The conjugated diene polymer latex (including the carboxy-modified conjugated diene polymer latex) used in the present invention may contain additives that are generally mixed in the field of latexes, such as pH adjusters, defoamers, preservatives, chelating agents, oxygen scavengers, dispersants, and anti-aging agents.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine, and the like. Alkali metal hydroxides and ammonia are preferable.

The solid content concentration of the conjugated diene polymer latex (including the carboxy-modified conjugated diene polymer latex) used in the present invention is preferably 30 to 70 wt %, more preferably 40 to 70 wt %. Adjusting the solid content concentration to the aforementioned ranges can suppress the occurrence of aggregates in the latex more effectively and can suppress separation of polymer particles during storage of the latex more effectively.

The conjugated diene polymer latex composition of the present invention comprises the aforementioned xanthogen compound dispersion of the present invention and a vulcanizing agent, in addition to the aforementioned latex of the conjugated diene polymer.

The amount of the xanthogen compound dispersion to be blended in the conjugated diene polymer latex composition of the present invention is not particularly limited, but is an amount so that the content of the xanthogen compound becomes preferably 0.01 to 10 parts by weight, more preferably 0.1 to 7 parts by weight, and still more preferably 0.5 to 5 parts by weight, with respect to 100 parts by weight of the conjugated diene polymer. Adjusting the amount of the xanthogen compound dispersion to be blended to the aforementioned ranges can further improve the tear strength, while suppressing the onset of symptoms of the delayed allergy (Type IV) for the obtained molded film such as a dip-molded product.

The xanthogen compound contained in the xanthogen compound dispersion may be present in the form of a xanthate by action of an activator contained in the conjugated diene polymer latex composition of the present invention. As a result, two or more xanthogen compounds may be contained in the conjugated diene polymer latex composition. Alternatively, in the case where sulfur is contained in the conjugated diene polymer latex composition as a sulfur vulcanizing agent or the like, a part of the xanthogen compound in the conjugated diene polymer latex composition may be present in the form of a xanthogen disulfide or a xanthogen polysulfide due to the action of sulfur.

As the vulcanizing agent, a sulfur vulcanizing agent can be suitably used. Examples of the sulfur vulcanizing agent include a sulfur such as powder sulfur, flowers of sulfur, precipitated sulfur, colloid sulfur, surface-treated sulfur, and insoluble sulfur; and a sulfur-containing compound such as sulfur chloride, sulfur dichloride, morpholine disulfide, alkyl phenol disulfide, caprolactam disulfide (N,N'-dithio-bis (hexahydro-2H-azepinone-2)), phosphorus-containing polysulfides, polymer polysulfides, and 2-(4'-moipholinodithio) benzothiazole. Among these, the sulfur can be preferably used. One of the sulfur vulcanizing agents may be used alone, or two or more of them may be used in combination.

The content of the vulcanizing agent in the latex composition of the present invention is not particularly limited, but is preferably 0.1 to 10 parts by weight, more preferably 0.2 to 5 parts by weight, and still more preferably 0.5 to 3 parts by weight, with respect to 100 parts by weight of the conjugated diene polymer. Adjusting the content of the vulcanizing agent to the aforementioned ranges can further increase the tensile strength of the obtained molded film such as a dip-molded product, while suppressing an increase of hardness.

The conjugated diene polymer latex composition of the present invention preferably further comprises an activator.

The activator may be any compound that acts as an activator when used with the xanthogen compound contained in the xanthogen compound dispersion, and is not particularly limited. Examples of the activator include metallic oxides. The metallic oxide is preferred since it also acts as a crosslinking agent to crosslink the carboxyl group when the carboxy-modified conjugated diene polymer is used as a conjugated diene polymer, thereby further enhancing the tensile strength of the obtained molded film such as a dip-molded product.

The metal oxide is not particularly limited, but examples thereof include zinc oxide, magnesium oxide, titanium oxide, calcium oxide, lead oxide, iron oxide, copper oxide, tin oxide, nickel oxide, chromium oxide, cobalt oxide, aluminum oxide, and the like. Among these, zinc oxide is preferable, for further improving the tensile strength of the obtained molded film such as a dip-molded product. One of these metal oxides can be used alone, or two or more of them can be used in combination.

The content of the activator in the conjugated diene polymer latex composition of the present invention is not particularly limited, but is preferably 0.01 to 30 parts by weight, more preferably 0.1 to 10 parts by weight, and still more preferably 0.5 to 5 parts by weight, with respect to 100 parts by weight of the conjugated diene polymer. Adjusting the content of the activator to the aforementioned ranges can further improve the tensile strength of the obtained molded film such as a dip-molded product.

Further, the conjugated diene polymer latex composition of the present invention may further contain a vulcanization accelerator within the range capable of suppressing the onset of symptoms of delayed allergy (Type IV) in the obtained molded film such as a dip-molded product.

As the vulcanization accelerator, vulcanization accelerators that are generally used in film molding such as dip molding can be used, and examples thereof include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio carbamoylthio)benzothiazole, 2-(2,6-dimethyl-4-morpholinothio)benzothiazole, 2-(4'-morpholino dithio)benzothiazole, 4-morpholinyl-2-benzothiazyl disulfide, 1,3-bis(2-benzothiazyl mercaptomethyl)urea, and the like. From the viewpoint of appropriately suppressing the onset of the symptoms of delayed allergy (Type IV), a vulcanization accelerator other than a thiuram-based vulcanization accelerator, a dithiocarbamate-based vulcanization accelerator, and a thiazole-based vulcanization accelerator is preferably used. One of the vulcanization accelerators may be used alone, or two or more of them may be used in combination.

The conjugated diene polymer latex composition of the present invention can further contain compounding agents including anti-aging agents; dispersants; reinforcers such as carbon black, silica, and talc; fillers such as calcium carbonate and clay; ultraviolet absorbers; and plasticizers, as required.

Examples of the anti-aging agents include phenolic anti-aging agents containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, and a butylated reaction product of p-cresol with dicyclopentadiene; thiobisphenol anti-aging agents such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester anti-aging agents such as tris(nonylphenyl) phosphite, diphenylisodecyl phosphite, and tetraphenyl dipropylene glycol diphosphite; sulfur ester anti-aging agents such as dilauryl thiodipropionate; amine anti-aging agents such as phenyl-α-naphthyl amine, phenyl-β-naphthyl amine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensate; quinoline anti-aging agents such as 6-ethoxy-2,2,4-trimethyl-1,2-dihydroquinoline; and hydroquinone anti-aging agents such as 2,5-di-(t-amyl)hydroquinone. One of these anti-aging agents can be used alone, or two or more of them can be used in combination.

The content of the anti-aging agent in the conjugated diene polymer latex composition of the present invention is preferably 0.05 to 10 parts by weight, more preferably 0.1 to 5 parts by weight, with respect to 100 parts by weight of the conjugated diene polymer.

The method for preparing the conjugated diene polymer latex composition of the present invention is not particularly limited, and includes, for example, a method for mixing the activator and the xanthogen compound dispersion as well as various compounding agents used as required with the aforementioned latex of the conjugated diene polymer. In this case, a method of preparing an aqueous dispersion of ingredients other than the latex of the conjugated diene polymer, and thereafter mixing the aqueous dispersion with the latex of the conjugated diene polymer can be applied.

The solid content concentration of the conjugated diene polymer latex composition of the present invention is preferably 10 to 60 wt %, more preferably 10 to 55 wt %.

In the present invention, from the viewpoint of obtaining a molded film such as a dip-molded product having sufficient mechanical properties, the aging (pre-vulcanization) is preferably performed on the conjugated diene polymer latex composition of the present invention prior to being subjected to film forming such as dip molding. The time of aging (pre-vulcanization) is not particularly limited, but is preferably 6 to 70 hours, more preferably 6 to 60 hours, and still more preferably 6 to 50 hours. In preparing the conjugated diene polymer latex composition, when a material further comprising a nonionic surfactant and/or a nonionic anionic surfactant is used as a xanthogen compound dispersion, a molded film such as a dip-molded product having sufficient mechanical properties can be obtained even when the time of the aging (pre-vulcanization) is shortened (e.g., preferably 6 to 30 hours, more preferably 6 to 18 hours). As a result, the time required for the aging (pre-vulcanization) is further shortened and the production efficiency is further enhanced. The temperature of the pre-vulcanization is not particularly limited, but is preferably 20 to 40° C.

<Molded Film>

The molded film of the present invention is a molded product in the form of a film composed of the conjugated diene polymer latex composition of the present invention as described above. The film thickness of the molded film of the present invention is preferably 0.03 to 0.50 mm, more preferably 0.05 to 0.40 mm, particularly preferably 0.08 to 0.30 mm.

The molded film of the present invention is not particularly limited but is suitably a dip-molded product obtained by dip-molding the conjugated diene polymer latex composition of the present invention. The dip molding is a method of immersing a mold in the conjugated diene polymer latex composition, depositing the composition on the surface of the mold, then pulling the mold out of the composition, and thereafter drying the composition deposited on the surface of the mold. The mold before the immersion in the conjugated diene polymer latex composition may be preheated. Further, before the mold is immersed in the conjugated diene polymer latex composition or after the mold is pulled out of the conjugated diene polymer latex composition, a coagulant can be used, as required.

Specific examples of the method for using the coagulant include a method of attaching the coagulant to the mold by immersing, in a coagulant solution, the mold before the immersion in the conjugated diene polymer latex composition (anode coagulant dipping), and a method of immersing the mold on which the conjugated diene polymer latex composition has been deposited in a coagulant solution (Teague coagulant dipping), and the anode coagulant dipping is preferable in that a dip-molded product with less unevenness in thickness is obtained.

Specific examples of the coagulant include a water-soluble polyvalent metallic salt including a metal halide such as barium chloride, calcium chloride, magnesium chloride, zinc chloride, and aluminum chloride; a nitrate such as barium nitrate, calcium nitrate, and zinc nitrate; an acetate such as barium acetate, calcium acetate, and zinc acetate; and a sulfate such as calcium sulfate, magnesium sulfate, and aluminum sulfate. Among these, a calcium salt is preferable, and calcium nitrate is more preferable. One of these water-soluble polyvalent metallic salts can be used alone, or two or more of them can be used in combination.

The coagulant can be generally used as a solution of water, alcohol, or a mixture thereof and is preferably used in the form of an aqueous solution. The aqueous solution may further contain water-soluble organic solvents such as methanol and ethanol, and nonionic surfactants. The concentration of the coagulant differs depending on the type of the water-soluble polyvalent metallic salts but is preferably 5 to 50 wt %, more preferably 10 to 30 wt %.

The mold after being pulled out of the conjugated diene polymer latex composition is generally heated to dry the deposit famed on the mold. The drying conditions may be appropriately selected.

Then, the dip-molded layer obtained is subjected to heat treatment for vulcanization. Before the heat treatment, immersion in water, preferably hot water at 30 to 70° C., for about 1 to 60 minutes may be performed to remove water-soluble impurities (such as excess emulsifiers and coagulants). Water-soluble impurities may be removed after the heat treatment of the dip-molded layer but are preferably removed before the heat treatment since water-soluble impurities can be removed more efficiently.

The dip-molded layer is vulcanized by heat treatment generally at a temperature of 80 to 150° C., preferably for 10 to 130 minutes. As a heating method, methods by external heating using infrared rays or heated air, or internal heating using high-frequency waves can be employed. Among these, external heating using heated air is preferable.

Then, a dip-molded product is obtained as a molded film by detaching the dip-molded layer from the mold for dip molding. As a detaching method, methods of peeling the film from the mold for forming by hand and peeling the film by water pressure or pressure of compressed air can be employed. After the detachment, heat treatment at a temperature of 60 to 120° C. for 10 to 120 minutes may be further performed.

The molded film of the present invention may be obtained by any method other than the method of dip-molding the conjugated diene polymer latex composition of the present invention as long as the method enables formation of the conjugated diene polymer latex composition of the present invention into a film (such as coating method).

The molded film of the present invention containing the dip-molded product of the present invention is obtained using the conjugated diene polymer latex composition of the present invention. Thus, time required for the aging (pre-vulcanization) is shortened and the molded film of the present invention has excellent productivity and also excellent tear strength. Therefore, the molded film of the present invention can be used particularly suitably, for example, as a glove. In the case where the molded film forms a glove, inorganic fine particles such as talc and calcium carbonate or organic fine particles such as starch particles may be spread on the surface of the glove, an elastomer layer containing fine particles may be famed on the surface of the glove, or the surface layer of the glove may be chlorinated, in order to prevent the close contact on the contact surface of the molded film with itself and improve slippage when putting it on and taking it off.

Further, the molded film of the present invention containing the dip-molded product of the present invention can be used as medical supplies such as baby bottle nipples, droppers, tubes, water pillows, balloon stalls, catheters, and condoms; toys such as balloons, dolls, and balls; industrial supplies such as pressure molding bags and gas storage bags; fingerstalls; and the like, other than the aforementioned glove.

<Adhesive Composition>

In the present invention, the conjugated diene polymer latex composition of the present invention can be used as an adhesive composition.

The content (solid content) of the conjugated diene polymer latex composition of the present invention in the adhesive composition is preferably 5 to 60 wt %, more preferably 10 to 30 wt %.

The adhesive composition preferably contains an adhesive resin in addition to the conjugated diene polymer latex composition of the present invention. The adhesive resin is not specifically limited, but a resorcinol-formaldehyde resin, a melamine resin, an epoxy resin, and an isocyanate resin, for example, can be suitably used. Among these, a resorcinol-formaldehyde resin is preferable. A known resorcinol-formaldehyde resin (such as disclosure of Japanese Patent Application Laid-Open No. 55-142635) can be used. The reaction ratio of resorcinol to formaldehyde is generally 1:1 to 1:5, preferably 1:1 to 1:3, in terms of the molar ratio of "resorcinol:formaldehyde".

For further enhancing the adhesion of the adhesive composition, the adhesive composition can contain 2,6-bis(2,4-dihydroxyphenyl methyl)-4-chlorophenol or a similar compound, isocyanate, block isocyanate, ethylene urea, polyepoxide, modified polyvinyl chloride resin, and the like, which are conventionally used.

Further, the adhesive composition can contain a crosslinking aid. Containing a crosslinking aid can improve the mechanical strength of the obtained composite described later using the adhesive composition. Examples of the crosslinking aid can include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TAIC (triallyl isocyanurate); maleimide compounds such as bismaleimide, phenyl maleimide, and N,N-m-phenylene dimaleimide; sulfurs; and the like.

<Adhesive Layer-Forming Substrate>

The adhesive layer-forming substrate of the present invention is obtained by forming an adhesive layer famed using the aforementioned conjugated diene polymer latex composition or the adhesive composition of the present invention on a surface of a substrate.

The substrate is not specifically limited, but a fiber substrate, for example, can be used. The type of fibers constituting the fiber substrate is not specifically limited, and examples thereof include vinylon fibers, polyester fibers, polyamide fibers such as nylon and aramid (aromatic polyamide), glass fibers, cottons, rayons, and the like. These can be appropriately selected corresponding to the application. The shape of the fiber substrate is not specifically limited, and examples thereof can include shapes of staples, filaments, cords, ropes, woven fabrics (such as canvas), and the like, which can be appropriately selected corresponding to the application. For example, the adhesive layer-forming substrate can be used as a substrate-rubber composite by adhering to rubber via an adhesive layer. The substrate-rubber composite is not specifically limited, but examples thereof include a toothed rubber belt with a core using a fiber substrate in the form of a cord, a toothed rubber belt using a fiber substrate in the form of a base fabric such as a canvas, and the like.

The method for obtaining the substrate-rubber composite is not specifically limited, but examples thereof include a method of attaching the conjugated diene polymer latex composition or the adhesive composition to a substrate, for example, by immersion and the like to obtain an adhesive layer-forming substrate and placing the adhesive layer-forming substrate on rubber, followed by heating and pressurization. The pressurization can be performed using a compression (press) molding machine, a metal roll, an injection molding machine, and the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables molding of rubber and adhesion between the adhesive layer-forming substrate and the rubber to be performed simultaneously. A mold for imparting a desired surface shape to the rubber of the substrate-rubber composite as a target is preferably famed on the inner surface of the mold of the compressor or the surface of the roll used for the pressurization.

Further, one aspect of the substrate-rubber composite can include a substrate-rubber-substrate composite. The substrate-rubber-substrate composite can be famed, for example, by combining a substrate (which may be a composite of two or more substrates) with the substrate-rubber composite. Specifically, a core serving as a substrate and a base fabric serving as rubber and a substrate are layered (at this time, the conjugated diene polymer latex composition or the adhesive composition has been appropriately attached to the core and the base fabric to form an adhesive layer-forming substrate), followed by pressurization under heating, so that a substrate-rubber-substrate composite can be obtained.

The obtained substrate-rubber composite using the adhesive layer-forming substrate of the present invention is excellent in mechanical strength, abrasion resistance, and water resistance and therefore can be suitably used as a belt such as a flat belt, a V belt, a V-ribbed belt, a round belt, a square belt, and a toothed belt. Further, the obtained substrate-rubber composite using the adhesive layer-forming substrate of the present invention is excellent in oil resistance and can be suitably used as an in-oil belt. Further, the obtained substrate-rubber composite using the adhesive layer-forming substrate of the present invention can be suitably used also for hoses, tubes, diaphragms, and the like. Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The obtained substrate-rubber composite using the adhesive layer-forming substrate of the present invention can be used also as industrial products such as seals and rubber rolls other than the aforementioned applications. Examples of the seals include seals for moving parts such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of OA equipment such as printing equipment and copy equipment; fiber processing rolls such as stretching rolls for spinning and draft rolls for spinning; steel rolls such as bridle rolls, snubber rolls, and steering rolls; and the like.

EXAMPLES

Hereinafter, the present invention will be specifically described with reference to the Examples. However, the present invention is not limited to these examples. The "part(s)" below is based on weight, unless otherwise specified. Various physical properties were measured as follows.

<Solid Content Concentration>

2 g of each sample was accurately weighed (weight: X2) into an aluminum dish (weight: X1), followed by drying in a hot air dryer at 105° C. for 2 hours. Subsequently, after cooling in a desiccator, the weight thereof including the aluminum dish was measured (weight: X3), to calculate the solid content concentration according to the following calculation formula.

Solid content concentration (wt %)=(X3−X1)×100/X2

<Modification Rate of Carboxy-Modified Synthetic Polyisoprene>

With regard to the carboxy-modified synthetic polyisoprene constituting the latex of the carboxy-modified synthetic polyisoprene, the number of carboxyl groups of the carboxy-modified synthetic polyisoprene was determined by neutralization titration using an aqueous solution of sodium hydroxide. Then, on a basis of the determined number of carboxyl groups, a modification rate by a monomer having a carboxyl group was determined according to the following equation.

Modification rate (wt %)=(X/Y)×100

In the above equation, X represents a weight of a monomer unit having a carboxyl group in the carboxy-modified synthetic polyisoprene, and Y represents a weight of the carboxy-modified synthetic polyisoprene, respectively.

<Patch Test>

Test specimens obtained by cutting a dip-molded product in the form of a film with a film thickness of about 0.2 mm into a size of 10×10 mm were attached respectively to the arms of 10 subjects. Thereafter, the attached portions were observed after 48 hours to check whether allergic symptoms of delayed allergy (Type IV) occurred, and evaluation was made according to the following criteria.

The patch test was performed using a dip-molded product whose time of aging (pre-vulcanization) was 48 hours.

A: No allergic symptoms were observed in all of the subjects.

B: Allergic symptoms were observed in a part of the subjects.

<Tear Strength of Dip-Molded Product, Stability of Tear Strength>

In accordance with ASTM D624-00, a dip-molded product was allowed to stand still in a constant-temperature and constant-humidity room at 23° C. and a relative humidity of 50% for 24 hours or more. Thereafter, a test piece for measuring tear strength was prepared by punching out with a dumbbell (product name "Die C", manufactured by DUMBBELL CO., LTD.). The test piece was stretched at a stretching speed of 500 mm/min using a TENSILON Universal Material Testing Instrument (product name "RTG-1210", manufactured by A&D Company, Limited) to measure the tear strength (unit: N/mm). The measurement was carried out with five specimens. Among the measured values of the tear strength of five specimens, the median (i.e., a value of tear strength of the test piece that showed the third largest value of the five test pieces) was adopted as the value of tear strength. The stability of tear strength was also evaluated with the measured values of the tear strength of the five specimens according to the following criteria.

Good: a ratio of the specimens whose measured values of the tear strength fall within the range of ±10% of the median being 70% or more (i.e., the number of specimens whose measured values of the tear strength fall within the range of ±10% of the median being four or more of the five specimens)

Poor: a ratio of the specimens whose measured values of the tear strength fall within the range of ±10% of the median being less than 70% (i.e., the number of specimens whose measured values of the tear strength fall within the range of ±10% of the median being three or less of the five specimens)

In Examples 1 to 5 and Comparative Examples 1 to 3, the tear strength and the stability of tear strength of the dip-molded product were measured with dip-molded products whose time of aging (pre-vulcanization) was 48 hours and dip-molded products whose time of aging (pre-vulcanization) was 72 hours. In Examples 6 to 12, the tear strength and the stability of tear strength of the dip-molded product were measured with dip-molded products whose time of aging (pre-vulcanization) was 6 hours and dip-molded products whose time of aging (pre-vulcanization) was 48 hours.

<Pinhole of Dip-Molded Product>

Whether a pinhole was generated in the five dip-molded products (gloves) obtained by dip molding was visually confirmed and evaluated according to the following criteria.

Good: no pinhole being generated in all the five dip-molded products

Poor: a pinhole being generated in at least one of the five dip-molded products

In Examples 1 to 5 and Comparative Examples 1 to 3, the pinhole was continued in dip-molded products whose time of aging (pre-vulcanization) was 48 hours and dip-molded products whose time of aging (pre-vulcanization) was 72 hours. In Examples 6 to 12, the pinhole was continued in dip-molded products whose time of aging (pre-vulcanization) was 6 hours and dip-molded products whose time of aging (pre-vulcanization) was 48 hours.

Preparation Example 1

Preparation of Latex of Carboxy-Modified Synthetic Polyisoprene (A-1)

Synthetic polyisoprene (product name "NIPOL IR2200L", manufactured by Zeon Corporation, isoprene homopolymer, and amount of cis-bond units: 98%) with a weight-average molecular weight of 1,300,000 was mixed with cyclohexane and dissolved therein by raising the temperature to 60° C. under stirring, to prepare a cyclohexane solution (a) of synthetic polyisoprene (solid content concentration: 8 wt %) with a viscosity, as measured using a type B viscometer, of 12,000 mPa·s.

Meanwhile, 20 parts of sodium rosinate was added to water and dissolved therein by raising the temperature to 60° C., to prepare an aqueous solution of anionic surfactant (b) with a concentration of 1.5 wt %.

Next, the cyclohexane solution (a) and the aqueous solution of anionic surfactant (b) were mixed at a weight ratio of 1:1.5 using a mixer (product name "Multi Line mixer MS26-MMR-5.5L", manufactured by SATAKE CHEMICAL EQUIPMENT MFG., LTD.) and then were mixed and emulsified at a rotational speed of 4100 rpm using an emulsifying device (product name "MILDER MDN310", manufactured by Pacific Machinery & Engineering Co., Ltd.), to obtain an emulsified liquid (c). At that time, the total feed flow rate of the cyclohexane solution (a) and the aqueous solution of anionic surfactant (b) was 2,000 kg/hr, the temperature was 60° C., and the back pressure (gauge pressure) was 0.5 MPa.

Subsequently, the emulsified liquid (c) was heated to 80° C. under reduced pressure of −0.01 to −0.09 MPa (gauge pressure), thereby distilling off cyclohexane, to obtain an aqueous dispersion of synthetic polyisoprene (d). At that time, a defoamer (product name "SM5515", manufactured by Dow Coining Toray Co., Ltd.) was continuously added by spraying in amount of 300 ppm by weight with respect to synthetic polyisoprene in the emulsified liquid (c). When distilling off cyclohexane, the emulsified liquid (c) was adjusted to 70 vol % or less of the tank volume and stirring was gradually conducted at 60 rpm using a three-stage inclined paddle blade as a stirring blade.

After the completion of distilling off cyclohexane, the aqueous dispersion of synthetic polyisoprene (d) obtained was centrifuged at 4,000 to 5,000 G using a continuous centrifuge (product name "SRG510", manufactured by Alfa Laval AB), to obtain synthetic polyisoprene latex (e) as a light liquid. The centrifugation conditions of a solid content concentration of the aqueous dispersion (d) before centrifugation of 10 wt %, a flow rate during continuous centrifugation of 1300 kg/hr, and a back pressure (gauge pressure) of the centrifuge of 1.5 MPa were employed. The synthetic polyisoprene latex (e) obtained had a solid content concentration of 60 wt %.

Subsequently, 130 parts of distilled water for dilution was added with respect to 100 parts of the synthetic polyisoprene in the resulting synthetic polyisoprene latex (e) to dilute the latex. 0.8 parts (with respect to 100 parts of the synthetic polyisoprene) of the sodium salt of β-naphthalene sulfonic acid formaldehyde condensate (product name "DEMOL T-45", manufactured by Kao Corporation) as a dispersant diluted with 4 parts (with respect to 100 parts of the synthetic polyisoprene) of distilled water was added to the synthetic polyisoprene latex (e) over 5 minutes. Next, the synthetic polyisoprene latex (e) containing the dispersant was placed in a nitrogen-purged reactor provided with a stirrer, and was warmed to 30° C. while being stirred. Further, 2 parts of methacrylic acid as a monomer having a carboxyl group and 16 parts of distilled water were mixed in another vessel to prepare a diluted solution of methacrylic acid. The diluted solution of methacrylic acid was added to the reactor heated to 30° C. over 30 minutes.

Further, a solution (f) composed of 7 parts of distilled water, 0.32 parts of sodium formaldehyde sulfoxylate (product name "SFS", manufactured by MITSUBISHI GAS CHEMICAL COMPANY, INC.), 0.01 parts of ferrous sulfate (product name "Frost Fe", manufactured by CHELEST CORPORATION) was prepared using another container. After the solution (f) was transferred to the reactor, 0.5 parts of 1,1,3,3-tetramethylbutyl hydroperoxide (product name "PEROCTA H", manufactured by NOF CORPORATION) was added thereto to react at 30° C. for 1 hour, so that a latex of carboxy-modified synthetic polyisoprene (A-1) was obtained. The carboxy-modified synthetic polyisoprene (A-1) was concentrated by a centrifuge to obtain a light liquid having a solid content concentration of 56%. The modification rate by a monomer having a carboxyl group was measured for the obtained latex of carboxy-modified synthetic polyisoprene (A-1) according to the method mentioned above. The modification rate was 0.3 wt %.

Preparation Example 2

Preparation of Latex of Carboxy-Modified Synthetic Polyisoprene (A-2)

The amount of methacrylic acid used was changed to 5 parts. Except for this, a latex of carboxy-modified synthetic polyisoprene (A-2) with a solid content concentration of 55% was obtained in the same manner as in Preparation Example 1. The modification rate by a monomer having a carboxyl group was measured for the obtained latex of carboxy-modified synthetic polyisoprene (A-2) according to the method mentioned above. The modification rate was 1.0 wt %.

Preparation Example 3

Preparation of Latex of Carboxy-Modified Synthetic Polyisoprene (A-3)

The amount of methacrylic acid used was changed to 3 parts. Except for this, a latex of carboxy-modified synthetic polyisoprene (A-3) with a solid content concentration of 55% was obtained in the same manner as in Preparation Example 1. The modification rate by a monomer having a carboxyl group was measured for the obtained latex of carboxy-modified synthetic polyisoprene (A-3) according to the method mentioned above. The modification rate was 0.5 wt %.

Example 1

Preparation of Xanthogen Compound Dispersion

A xanthogen compound dispersion was obtained by mixing 2 parts of zinc diisopropylxanthate (product name "NOCCETFR ZIX", manufactured by Ouchi Shinko Chemical Industrial Co., Ltd., volume average particle size: 14 µm, 95% cumulative volume particle size (D95): 55 µm) as a xanthogen compound, 0.15 parts of polyoxyethylene distyrenated phenyl ether (product name "EMULGEN A-60", manufactured by Kao Corporation) as a nonionic surfactant, and 4.5 parts of water with a bead mill (product name "STARMILL LMZ-015", manufactured by Ashizawa Finetech Ltd.) to perform a pulverizing process. As a mixing condition of the bead mill, a ceramic magnetic bead of φ0.5 mm was used, and mixing was carried out for 1.5 hours at 3800 rpm. A volume average particle size and 95% cumulative volume particle size (D95) of the obtained xanthogen compound dispersion of zinc diisopropylxanthate were measured by a laser diffraction-scattering particle size distribution measurement instrument (product name "SALD-2300", manufactured by SHIMADZU CORPORATION). The volume average particle size of zinc diisopropylxanthate was 0.07 µm and the 95% cumulative volume particle size (D95) of the same was 0.1 µm.

Preparation of Latex Composition

First, 100% of carboxyl groups in a styrene-maleic acid mono-sec-butyl ester-maleic acid monomethyl ester polymer (product name "Scripset550", manufactured by Hercules Inc.) were neutralized with sodium hydroxide to prepare an aqueous solution of sodium salt (with a concentration of 10 wt %). Then, the aqueous solution of sodium salt was added to the latex of carboxy-modified synthetic polyisoprene (A-1) obtained in Preparation Example 1 in an amount of 0.8 parts in terms of solid content with respect to 100 parts of the carboxy-modified synthetic polyisoprene (A-1) in the latex, to obtain a mixture.

Then, 6.65 parts of the xanthogen compound dispersion prepared above (2 parts in tams of zinc diisopropyl xanthate) was added to 100 parts of the carboxy-modified synthetic polyisoprene (A-1) in the mixture under stirring the obtained mixture.

Subsequently, aqueous dispersions of compounding agents were added in amounts of 1.5 parts of zinc oxide as an activator, 1.5 parts of sulfur, and 2 parts of an anti-aging agent (product name "Wingstay L", manufactured by Goodyear Tire and Rubber Company) in terms of solid content, to obtain a latex composition. The obtained latex composition was divided into two parts. One part was subjected to the aging (pre-vulcanization) for 48 hours in a constant-temperature water bath adjusted to 25° C., and the other part was subjected to the aging (pre-vulcanization) for 72 hours in a constant-temperature water bath adjusted to 25° C., whereby a 48 hour-aged latex composition and a 72 hour-aged latex composition were obtained.

Preparation of Dip-Molded Product

A commercially available ceramic hand mold (manufactured by SHINKO CERAMICS CO., LTD.) was washed, followed by preheating in an oven at 70° C. Thereafter, the hand mold was immersed in an aqueous solution of a coagulant containing 18 wt % of calcium nitrate and 0.05 wt % of polyoxyethylene lauryl ether (product name "EMULGEN 109P", manufactured by Kao Corporation) for 5 seconds and was taken out of the aqueous solution of the coagulant. Subsequently, the hand mold was dried in an oven at 70° C. for 30 minutes or more, thereby allowing the coagulant to adhere to the hand mold, so that the hand mold was coated with the coagulant.

Thereafter, the hand mold coated with the coagulant was taken out of the oven and was immersed for 10 seconds in the 48 hour-aged latex composition obtained above. Subsequently, the hand mold was air-dried at room temperature for 10 minutes and was immersed in hot water at 60° C. for 5 minutes to elute water-soluble impurities, thereby forming a dip-molded layer on the hand mold. The dip-molded layer famed on the hand mold was vulcanized by heating in an oven under the conditions of a temperature of 130° C. for 30 minutes. Thereafter, the dip-molded layer was cooled to room temperature, and separated from the hand mold after spreading talc to obtain a glove-shaped dip-molded product (48 hour-aged product). In addition, a glove-shaped dip-molded product (72 hour-aged product) was obtained in the same manner as described above, except that the 72 hour-aged latex composition was used instead of the 48 hour-aged latex composition. Then, each measurement and evaluation of the patch test, the tear strength, the stability of tear strength, and the generation of the pinhole was carried out with the obtained dip-molded products (the 48 hour-aged product and 72 hour-aged product) according to the above method. The results are shown in Table 1.

Example 2

A pulverizing process in preparing a xanthogen compound dispersion was performed with a planetary ball mill (product name "Classic Line P-5", manufactured by FRITSCH GmbH), and mixing was carried out in the planetary ball mill with a ceramic magnetic ball of φ1.0 mm at 340 rpm for 1 hour. Except for this, a xanthogen compound dispersion was obtained in the same manner as in Example 1. A volume average particle size and 95% cumulative volume particle size (D95) of zinc diisopropylxanthate in the obtained xanthogen compound dispersion were measured in the same manner as in Example 1. The volume average particle size of zinc diisopropylxanthate was 1 µm and the 95% cumulative volume particle size (D95) of the same was 5 µm.

Then, in the same manner as in Example 1, except that the obtained xanthogen compound dispersion was used, a 48 hour-aged latex composition and 72 hour-aged latex composition, as well as dip-molded products (the 48 hour-aged product and 72 hour-aged product) were obtained, and the measurement and evaluation were performed in the same manner. The results are shown in Table 1.

Example 3

A pulverizing process in preparing a xanthogen compound dispersion was carried out with a ball mill (product name: "Magnetic Ball Mill", manufactured by NITTO KAGAKU CO., LTD.). Mixing by the ball mill was carried out using ceramic magnetic balls of φ10 mm to φ35 mm (mixed ceramic magnetic balls of φ10 mm, φ15 mm, φ20 mm, φ25 mm, φ30 mm and φ35 mm) under the condition of 50 rpm for 72 hours. Except for this, a xanthogen compound dispersion was obtained in the same manner as in Example 1. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 3 μm and the 95% cumulative volume particle size (D95) of the same was 16 μm.

Then, in the same manner as in Example 1, except that the obtained xanthogen compound dispersion was used, a 48 hour-aged latex composition and 72 hour-aged latex composition, as well as dip-molded products (the 48 hour-aged product and 72 hour-aged product) were obtained, and the measurement and evaluation were performed in the same manner. The results are shown in Table 1.

Example 4

The period of time for a pulverizing process by the ball mill in preparing a xanthogen compound dispersion was changed to 48 hours. Except for this, a xanthogen compound dispersion was obtained in the same manner as in Example 3. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 7 μm and the 95% cumulative volume particle size (D95) of the same was 35 μm.

Then, in the same manner as in Example 1, except that the obtained xanthogen compound dispersion was used, a 48 hour-aged latex composition and 72 hour-aged latex composition, as well as dip-molded products (the 48 hour-aged product and 72 hour-aged product) were obtained, and the measurement and evaluation were performed in the same manner. The results are shown in Table 1.

Example 5

In place of the latex of the carboxy-modified synthetic polyisoprene (A-1) obtained in Preparation Example 1, a latex of the carboxy-modified synthetic polyisoprene (A-2) obtained in Preparation Example 2 was used. Except for this, in the same manner as in Example 1, a 48 hour-aged latex composition and 72 hour-aged latex composition, as well as dip-molded products (a 48 hour-aged product and 72 hour-aged product) were obtained, and the measurement and evaluation were performed in the same manner. The results are shown in Table 1.

Comparative Example 1

The period of time for a pulverizing process by the ball mill in preparing a xanthogen compound dispersion was changed to 24 hours. Except for this, a xanthogen compound dispersion was obtained in the same manner as in Example 3. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 10 μm and the 95% cumulative volume particle size (D95) of the same was 44 μm.

Then, in the same manner as in Example 1, except that the obtained xanthogen compound dispersion was used, a 48 hour-aged latex composition and 72 hour-aged latex composition, as well as dip-molded products (the 48 hour-aged product and 72 hour-aged product) were obtained, and the measurement and evaluation were performed in the same manner. The results are shown in Table 1.

Comparative Example 2

In preparing a xanthogen compound dispersion, a pulverizing process was not performed (i.e., merely mixed). Except for this, a xanthogen compound dispersion was obtained in the same manner as in Example 1. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 14 μm and the 95% cumulative volume particle size (D95) of the same was 55 μm.

Then, in the same manner as in Example 1, except that the obtained xanthogen compound dispersion was used, a 48 hour-aged latex composition and 72 hour-aged latex composition, as well as dip-molded products (the 48 hour-aged product and 72 hour-aged product) were obtained, and the measurement and evaluation were performed in the same manner. The results are shown in Table 1.

Comparative Example 3

Preparation of Dispersion of Zinc Diethyldithiocarbamate

A dispersion of zinc diethyldithiocarbamate was obtained by mixing 0.3 parts of zinc diethyldithiocarbamate, 0.9 parts of water, and 0.03 parts of polyoxyethylene distyrenated phenyl ether (product name "EMULGEN A-60", manufactured by Kao Corporation) as a nonionic surfactant with a ball mill (product name: "Magnetic Ball Mill", manufactured by NITTO KAGAKU CO., LTD.) to perform a pulverizing process. The mixing conditions of the ball mill were the same as in Example 3. A volume average particle size and 95% cumulative volume particle size (D95) of zinc diethyldithiocarbamate in the obtained dispersion of zinc diethyldithiocarbamate were measured in the same manner as in Example 1. The volume average particle size of zinc diethyldithiocarbamate was 1 μm and 95% cumulative volume particle size (D95) of the same was 4 μm.

Preparation of Dispersion of Zinc Dibutyldithiocarbamate

A dispersion of zinc dibutyldithiocarbamate was obtained by mixing 0.5 parts of zinc dibutyldithiocarbamate, 1.5 parts of water, and 0.05 parts of polyoxyethylene distyrenated phenyl ether (product name "EMULGEN A-60", manufactured by Kao Corporation) as a nonionic surfactant with a ball mill (product name: "Magnetic Ball Mill", manufactured by NITTO KAGAKU CO., LTD.) to perform a pulverizing process. The mixing conditions of the ball mill were the same as in Example 3. A volume average particle size and 95% cumulative volume particle size (D95) of zinc dibutyldithiocarbamate in the obtained dispersion of zinc dibutyldithiocarbamate were measured in the same manner as in Example 1. The volume average particle size of zinc dibutyldithiocarbamate was 3 μm and the 95% cumulative volume particle size (D95) of the same was 13 μm.

Preparation of Dispersion of Zinc 2-Mercaptobenzothiazole

A dispersion of zinc 2-mercaptobenzothiazole was obtained by mixing 0.7 parts of zinc 2-mercaptobenzothiazole, 2.1 parts of water, and 0.07 parts of polyoxyethylene distyrenated phenyl ether (product name "EMULGEN A-60", manufactured by Kao Corporation) as a nonionic surfactant with a ball mill (product name: "Magnetic Ball Mill", manufactured by NITTO KAGAKU CO., LTD.) to perform a pulverizing process. The mixing conditions of the ball mill were the same as in Example 3. A volume average particle size and 95% cumulative volume particle size (D95) of zinc 2-mercaptobenzothiazole in the obtained dispersion of zinc 2-mercaptobenzothiazole were measured in the same manner as in Example 1. The volume average particle size of zinc 2-mercaptobenzothiazole was 0.5 μm and the 95% cumulative volume particle size (D95) of the same was 2 μm.

Preparation of Latex Composition and Production of Dip-Molded Product

In place of the xanthogen compound dispersion, 1.23 parts (0.3 parts in tams of zinc diethyldithiocarbamate) of the dispersion of zinc diethyldithiocarbamate prepared above, 2.05 parts (0.5 parts in terms of zinc dibutyldithiocarbamate) of a dispersion of zinc dibutyldithiocarbamate, and 2.87 parts (0.7 parts in terms of zinc 2-mercaptobenzothiazole) of a dispersion of zinc 2-mercaptobenzothiazole were used. Except for this, in the same manner as in Example 1, a 48 hour-aged latex composition and 72 hour-aged latex composition, as well as dip-molded products (a 48 hour-aged product and 72 hour-aged product) were obtained, and the measurement and evaluation were performed in the same manner. The results are shown in Table 1.

Comparative Example 4

In preparing a dispersion of zinc diethyldithiocarbamate, a dispersion of zinc dibutyldithiocarbamate, and a dispersion of zinc 2-mercaptobenzothiazole, the period of time for performing a pulverizing process with a ball mill was set to 24 hours. Except for this, in the same manner as in Comparative Example 3, a dispersion of zinc diethyldithiocarbamate, a dispersion of zinc dibutyldithiocarbamate, and a dispersion of zinc 2-mercaptobenzothiazole were obtained. The volume average particle size and 95% cumulative volume particle size (D95) of each vulcanization accelerator contained in the obtained dispersions were as shown in Table 1. Then, using these obtained dispersions, 48 hour-aged latex compositions and 72 hour-aged latex compositions as well as dip-molded products (48 hour-aged products and 72 hour-aged products) were obtained in the same manner as in Comparative Example 3, and the measurement and evaluation were performed in the same manner. The results are shown in Table 1.

[Table 1]

TABLE 1

|  |  |  |  |  | Example | | | | |
|---|---|---|---|---|---|---|---|---|---|
|  |  |  |  |  | 1 | 2 | 3 | 4 | 5 |
| Composition | Carboxy-modified synthetic polyisoprene (A-1) (modification rate: 0.3 wt %) | | | (part) | 100 | 100 | 100 | 100 | |
|  | Carboxy-modified synthetic polyisoprene (A-2) (modification rate. 1.0 wt %) | | | (part) |  |  |  |  | 100 |
|  | Sulfur | | | (part) | 1.5 | 1.5 | 1.5 | 1.5 | 1.5 |
|  | Zinc oxide | | | (part) | 1.5 | 1.5 | 1.5 | 1.5 | 1.5 |
|  | Dispersion of vulcanization accelerator | Xanthogen compound | Zinc diisopropyl xanthate (average particle size: 0.07 μm, D95: 0.1 μm) | (part) | 2 |  |  |  |  |
|  |  |  | Zinc diisopropyl xanthate (average particle size: 1 μm, D95: 5 μm) | (part) |  | 2 |  |  |  |
|  |  |  | Zinc diisopropyl xanthate (average particle size: 3 μm, D95: 16 μm) | (part) |  |  | 2 |  | 2 |
|  |  |  | Zinc diisopropyl xanthate (average particle size: 7 μm, D95: 35 μm) | (part) |  |  |  | 2 |  |
|  |  |  | Zinc diisopropyl xanthate (average particle size: 10 μm, D95: 44 μm) | (part) |  |  |  |  |  |
|  |  |  | Zinc diisopropyl xanthate (average particle size: 14 μm, D95: 55 μm) | (part) |  |  |  |  |  |
|  |  | Vulcanization accelerator other than xanthogen compound | Zinc diethyldithiocarbamte (average particle size: 1 μm, D95: 4 μm) | (part) |  |  |  |  |  |
|  |  |  | Zinc diethyldithiocarbamte (average particle size: 6 μm, D95: 20 μm) | (part) |  |  |  |  |  |
|  |  |  | Zinc dibutyldithiocarbamate (average particle size: 3 μm, D95: 13 μm) | (part) |  |  |  |  |  |
|  |  |  | Zinc dibutyldithiocarbamate (average particle size: 10 μm, D95: 29 μm) | (part) |  |  |  |  |  |
|  |  |  | Zinc 2-mercaptobenzothiazole (average particle size: 0.5 μm, D95: 2 μm) | (part) |  |  |  |  |  |

TABLE 1-continued

|  |  |  |  |  |  |  |  |  |  |
|---|---|---|---|---|---|---|---|---|---|
|  |  | Zinc 2-mercaptobenzothiazole (average particle size: 3 μm, D95: 10 μm) | (part) |  |  |  |  |  |  |
|  | Surfactant | Polyoxyethylene distyrenated phenyl ether | (part) | 0.15 | 0.15 | 0.15 | 0.15 | 0.15 |  |
| Evaluation | Patch test |  |  | A | A | A | A | A |  |
|  | Tear strength of 48 hour-aged product |  | (N/mm) | 41 | 41 | 40 | 38 | 42 |  |
|  | Stability of tear strength of 48 hour-aged product |  |  | Good | Good | Good | Good | Good |  |
|  | Whether pinhole(s) exists in 48 hour-aged product |  |  | Good | Good | Good | Good | Good |  |
|  | Tear strength of 72 hour-aged product |  | (N/mm) | 42 | 42 | 42 | 40 | 43 |  |
|  | Stability of tear strength of 72 hour-aged product |  |  | Good | Good | Good | Good | Good |  |
|  | Whether pinhole(s) exists in 72 hour-aged product |  |  | Good | Good | Good | Good | Good |  |

|  |  |  |  |  | Comparative Example | | | |
|---|---|---|---|---|---|---|---|---|
|  |  |  |  |  | 1 | 2 | 3 | 4 |
| Composition | Carboxy-modified synthetic polyisoprene (A-1) (modification rate: 0.3 wt %) |  |  | (part) | 100 | 100 | 100 | 100 |
|  | Carboxy-modified synthetic polyisoprene (A-2) (modification rate: 1.0 wt %) |  |  | (part) |  |  |  | 0 |
|  | Sulfur |  |  | (part) | 1.5 | 1.5 | 1.5 | 1.5 |
|  | Zinc oxide |  |  | (part) | 1.5 | 1.5 | 1.5 | 1.5 |
|  | Dispersion of vulcanization accelerator | Xanthogen compound | Zinc diisopropyl xanthate (average particle size: 0.07 μm, D95: 0.1 μm) | (part) |  |  |  |  |
|  |  |  | Zinc diisopropyl xanthate (average particle size: 1 μm, D95: 5 μm) | (part) |  |  |  |  |
|  |  |  | Zinc diisopropyl xanthate (average particle size: 3 μm, D95: 16 μm) | (part) |  |  |  |  |
|  |  |  | Zinc diisopropyl xanthate (average particle size: 7 μm, D95: 35 μm) | (part) |  |  |  |  |
|  |  |  | Zinc diisopropyl xanthate (average particle size: 10 μm, D95: 44 μm) | (part) | 2 |  |  |  |
|  |  |  | Zinc diisopropyl xanthate (average particle size: 14 μm, D95: 55 μm) | (part) |  | 2 |  |  |
|  |  | Vulcanization accelerator other than xanthogen compound | Zinc diethyldithiocarbamte (average particle size: 1 μm, D95: 4 μm) | (part) |  |  | 0.3 |  |
|  |  |  | Zinc diethyldithiocarbamte (average particle size: 6 μm, D95: 20 μm) | (part) |  |  |  | 0.3 |
|  |  |  | Zinc dibutyldithiocarbamate (average particle size: 3 μm, D95: 13 μm) | (part) |  |  | 0.5 |  |
|  |  |  | Zinc dibutyldithiocarbamate (average particle size: 10 μm, D95: 29 μm) | (part) |  |  |  | 0.5 |
|  |  |  | Zinc 2-mercaptobenzothiazole (average particle size: 0.5 μm, D95: 2 μm) | (part) |  |  | 0.7 |  |
|  |  |  | Zinc 2-mercaptobenzothiazole (average particle size: 3 μm, D95: 10 μm) | (part) |  |  |  | 0.7 |
|  |  | Surfactant | Polyoxyethylene distyrenated phenyl ether | (part) | 0.15 | 0.15 | 0.15 | 0.15 |
| Evaluation | Patch test |  |  |  | A | A | B | B |
|  | Tear strength of 48 hour-aged product |  |  | (N/mm) | 21 | 19 | 46 | 44 |
|  | Stability of tear strength of 48 hour-aged product |  |  |  | Poor | Poor | Good | Good |
|  | Whether pinhole(s) exists in 48 hour-aged product |  |  |  | Good | Good | Good | Good |
|  | Tear strength of 72 hour-aged product |  |  | (N/mm) | 40 | 20 | 37 | 38 |
|  | Stability of tear strength of 72 hour-aged product |  |  |  | Good | Poor | Good | Good |
|  | Whether pinhole(s) exists in 72 hour-aged product |  |  |  | Poor | Poor | Good | Good |

Evaluation of Examples 1 to 5 and Comparative Examples 1 to 4

As shown in Table 1, the latex composition obtained by using the xanthogen compound dispersion containing the xanthogen compound having a volume average particle size of 0.001 to 9 μm provided the dip-molded product in which the onset of symptoms of the delayed allergy (Type IV) was effectively suppressed. In addition, the obtained dip-molded product had sufficient tear strength, and further, the stability of tear strength was also high, and the generation of pinhole was effectively suppressed (Examples 1 to 5).

On the other hand, when the xanthogen compound dispersion containing the xanthogen compound having a volume average particle size of 10 μm was used, the generation of pinhole was confirmed in the obtained dip-molded product. In addition, when the time for aging was 48 hours, the tear strength was low and the stability of tear strength was poor. In order to obtain the sufficient tear strength was stability, the very long period of time as long as 72 hours was required for the aging (Comparative Example 1).

Further, when the xanthogen compound dispersion containing the xanthogen compound having a volume average particle size of 14 µm was used, the generation of pinhole was confirmed in the obtained dip-molded product. In both of the case where the time for aging was set to 48 hours and the case where the time for aging was set to 72 hours, the tear strength was low and the stability of tear strength was poor (Comparative Example 2).

When zinc diethyldithiocarbamate, zinc dibutyldithiocarbamate, and zinc 2-mercaptobenzothiazole were used as a vulcanization accelerator in place of the xanthogen compound, the onset of symptoms of the delayed allergy (Type IV) was confirmed in the obtained dip-molded product (Comparative Examples 3 and 4). These Comparative Examples 3 and 4 are examples in which zinc diethyldithiocarbamate, zinc dibutyldithiocarbamate, and zinc 2-mercaptobenzothiazole having the volume average particle sizes different from each other were used, but in both of Comparative Example 1 and Comparative Example 2, the effect on the tear strength, the stability of tear strength, and suppression of the generation of pinhole was almost the same.

Example 6

Preparation of Xanthogen Compound Dispersion

A xanthogen compound dispersion was obtained by mixing 2 parts of zinc diisopropylxanthate (product name "NOCCELER ZIX", manufactured by Ouchi Shinko Chemical Industrial Co., Ltd., volume average particle size: 14 µm, 95% cumulative volume particle size (D95): 55 µm) as a xanthogen compound, 0.15 parts of polyoxyethylene distyrenated phenyl ether (product name "EMULGEN A-60", manufactured by Kao Corporation) as a nonionic surfactant, and 4.5 parts of water with a ball mill (product name: "Magnetic Ball Mill", manufactured by NITTO KAGAKU CO., LTD.) to perform a pulverizing process. As mixing conditions of the ball mill, ceramic magnetic balls of φ15 mm and φ20 mm were used, and mixing was performed for 72 hours or more at 50 rpm. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 3 µm and the 95% cumulative volume particle size (D95) of the same was 16 µm.

Preparation of Latex Composition

First, 100% of carboxyl groups in a styrene-maleic acid mono-sec-butyl ester-maleic acid monomethyl ester polymer (product name "Scripset 550", manufactured by Hercules Inc.) were neutralized with sodium hydroxide, to prepare an aqueous solution of sodium salt (with a concentration of 10 wt %). Then, the aqueous solution of sodium salt was added to the latex of carboxy-modified synthetic polyisoprene (A-3) obtained in Preparation Example 3 in an amount of 0.8 parts in terms of solids content with respect to 100 parts of the carboxy-modified synthetic polyisoprene (A-3) in the latex to obtain a mixture.

Then, 6.65 parts (2 parts in terms of zinc diisopropylxanthate, 0.15 parts in terms of polyoxyethylene distyrenated phenyl ether) of the xanthate compound dispersion prepared above was added to 100 parts of the carboxy-modified synthetic polyisoprene (A-3) in the mixture under stirring the obtained mixture.

Subsequently, aqueous dispersions of compounding agents were added in amounts of 1.5 parts of zinc oxide as an activator, 1.5 parts of sulfur, and 2 parts of an anti-aging agent (product name "Wingstay L", manufactured by Goodyear Tire and Rubber Company) in tams of solid content, to obtain a latex composition. The obtained latex composition was divided into two parts. One part was subjected to the aging (pre-vulcanization) for 6 hours in a constant-temperature water bath adjusted to 25° C. to obtain a 6 hour-aged latex composition. The other part was subjected to the aging (pre-vulcanization) for 48 hours in a constant-temperature water bath adjusted to 25° C. to obtain a 48 hour-aged latex composition.

Except that the obtained 6 hour-aged latex compositions and 48 hour-aged latex compositions were used, gloveshaped dip-molded products (a 6 hour-aged product and 48 hour-aged product) were obtained in the same manner as in Example 1. The measurement and evaluation were performed in the same manner as in Example 1. The results are shown in Table 2.

Example 7

In place of the latex of the carboxy-modified synthetic polyisoprene (A-3) obtained in Preparation Example 3, a latex of the carboxy-modified synthetic polyisoprene (A-2) obtained in Preparation Example 2 was used. Except for this, in the same manner as in Example 6, a 6 hour-aged latex composition and 48 hour-aged latex composition, as well as dip-molded products (a 6 hour-aged product and 48 houraged product) were obtained, and the measurement and evaluation were performed in the same manner. The results are shown in Table 2.

Example 8

In preparing a xanthogen compound dispersion, 2 parts of zinc butylxanthate was used as a xanthogen compound in place of 2 parts of zinc diisopropylxanthate. Except for this, a xanthogen compound dispersion was obtained in the same manner as in Example 6. A volume average particle size and 95% cumulative volume particle size (D95) of zinc butylxanthate in the obtained xanthogen compound dispersion were measured in the same manner as in Example 1. The volume average particle size of zinc butylxanthate was 3 µm and the 95% cumulative volume particle size (D95) of the same was 16 µm.

Then, in the same manner as in Example 6, except that the obtained xanthogen compound dispersion was used, a 6 hour-aged latex composition and 48 hour-aged latex composition, as well as dip-molded products (the 6 hour-aged product and 48 hour-aged product) were obtained, and the measurement and evaluation were performed in the same manner. The results are shown in Table 2.

Example 9

In preparing a xanthogen compound dispersion, 2 parts of zinc etylxanthate was used as a xanthogen compound in place of 2 parts of zinc diisopropylxanthate. Except for this, a xanthogen compound dispersion was obtained in the same manner as in Example 6. A volume average particle size and 95% cumulative volume particle size (D95) of zinc ethylxanthate in the obtained xanthogen compound dispersion were measured in the same manner as in Example 1. The volume average particle size of zinc ethylxanthate was 3 μm and the 95% cumulative volume particle size (D95) of the same was 16 μm.

Then, in the same manner as in Example 6, except that the obtained xanthogen compound dispersion was used, a 6 hour-aged latex composition and 48 hour-aged latex composition, as well as dip-molded products (the 6 hour-aged product and 48 hour-aged product) were obtained, and the measurement and evaluation were performed in the same manner. The results are shown in Table 2.

Example 10

In preparing a xanthogen compound dispersion, 0.15 parts of polyoxyethylene lauryl ether (polyoxyethylene (6) lauryl ether, product name "EMULGEN 108", manufactured by Kao Corporation) was used as a nonionic surfactant in place of 0.15 parts of polyoxyethylene distyrenated phenyl ether. Except for this, a xanthogen compound dispersion was obtained in the same manner as in Example 6. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 3 μm and the 95% cumulative volume particle size (D95) of the same was 16 μm.

Then, in the same manner as in Example 6, except that the obtained xanthogen compound dispersion was used, a 6 hour-aged latex composition and 48 hour-aged latex composition, as well as dip-molded products (the 6 hour-aged product and 48 hour-aged product) were obtained, and the measurement and evaluation were performed in the same manner. The results are shown in Table 2.

Example 11

In preparing a xanthogen compound dispersion, 0.15 parts of polyoxyethylene alkyl ether (polyoxyethylene (9) alkyl (sec-C11-15) ether, product name "EMULGEN 709", manufactured by Kao Corporation) was used as a nonionic surfactant in place of 0.15 parts of polyoxyethylene distyrenated phenyl ether in preparing the xanthogen compound dispersion. Except for this, a xanthogen compound dispersion was obtained in the same manner as in Example 6. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 3 μm and the 95% cumulative volume particle size (D95) of the same was 16 μm.

Then, in the same manner as in Example 6, except that the obtained xanthogen compound dispersion was used, a 6 hour-aged latex composition and 48 hour-aged latex composition, as well as dip-molded products (the 6 hour-aged product and 48 hour-aged product) were obtained, and the measurement and evaluation were performed in the same manner. The results are shown in Table 2.

Example 12

In preparing a xanthogen compound dispersion, 0.15 parts of polyoxyethylene polyoxypropylene glycol (product name "EMULGEN PP-290", manufactured by Kao Corporation) was used as a nonionic surfactant in place of 0.15 parts of polyoxyethylene distyrenated phenyl ether in preparing the xanthogen compound dispersion. Except for this, a xanthogen compound dispersion was obtained in the same manner as in Example 6. A volume average particle size and a 95% cumulative volume particle size (D95) of zinc diisopropylxanthate in the obtained xanthogen compound dispersion were measured in the same manner as in Example 1. The volume average particle size of zinc diisopropylxanthate was 3 μm and the 95% cumulative volume particle size (D95) of the same was 16 μm.

Then, in the same manner as in Example 6, except that the obtained xanthogen compound dispersion was used, a 6 hour-aged latex composition and 48 hour-aged latex composition, as well as dip-molded products (the 6 hour-aged product and 48 hour-aged product) were obtained, and the measurement and evaluation were performed in the same manner. The results are shown in Table 2.

TABLE 2

| | | | | Example | | | |
|---|---|---|---|---|---|---|---|
| | | | | 6 | 7 | 8 | 9 |
| Composition | Carboxy-modified synthetic polyisoprene (A-3) (modification rate: 0.5 wt %) | | (part) | 100 | | 100 | 100 |
| | Carboxy-modified synthetic polyisoprene (A-2) (modification rate: 1.0 wt %) | | (part) | | 100 | | |
| | Sulfur | | (part) | 1.5 | 1.5 | 1.5 | 1.5 |
| | Zinc oxide | | (part) | 1.5 | 1.5 | 1.5 | 1.5 |
| | Xanthogen compound dispersion | Xanthogen compound | Zinc diisopropyl xanthate (average particle size: 3 μm, D95: 16 μm) | (part) | 2 | 2 | | |
| | | | Zinc butyl xanthate (average particle size: 3 μm, D95: 16 μm) | (part) | | | 2 | |
| | | | Zinc ethyl xanthate (average particle size: 3 μm, D95: 16 μm) | (part) | | | | 2 |
| | | Surfactant | Polyoxyethylene distyrenated phenyl ether | (part) | 0.15 | 0.15 | 0.15 | 0.15 |
| | | | Polyoxyethylene (6) lauryl ether | (part) | | | | |
| | | | Polyoxyethylene (9) alkyl(sec-C11-C15) ether | (part) | | | | |
| | | | Polyoxyethylene polyoxypropylene glycol | (part) | | | | |

TABLE 2-continued

| Evaluation | Patch test | | A | A | A | A |
|---|---|---|---|---|---|---|
| | Tear stregth of 6 hour-aged product | (N/mm) | 38 | 42 | 38 | 38 |
| | Stability of tear strength of 6 hour-aged product | | Good | Good | Good | Good |
| | Whether pinhole(s) exists in 6 hour-aged product | | Good | Good | Good | Good |
| | Tear strength of 48 hour-aged proctact | (N/mm) | 42 | 43 | 41 | 40 |
| | Stability of tear strength of 48 hour-aged product | | Good | Good | Good | Good |
| | Whether pinhole(s) exists in 48 hour-aged product | | Good | Good | Good | Good |

| | | | | | Example | | |
|---|---|---|---|---|---|---|---|
| | | | | | 10 | 11 | 12 |
| Composition | Carboxy-modified synthetic polyisoprene (A-3) (modification rate: 0.5 wt %) | | | (part) | 100 | 100 | 100 |
| | Carboxy-modified synthetic polyisoprene (A-2) (modification rate: 1.0 wt %) | | | (part) | | | |
| | Sulfur | | | (part) | 1.5 | 1.5 | 1.5 |
| | Zinc oxide | | | (part) | 1.5 | 1.5 | 1.5 |
| | Xanthogen compound dispersion | Xanthogen compound | Zinc diisopropyl xanthate (average particle size: 3 μm, D95: 16 μm) | (part) | 2 | 2 | 2 |
| | | | Zinc butyl xanthate (average particle size: 3 μm, D95: 16 μm) | (part) | | | |
| | | | Zinc ethyl xanthate (average particle size: 3 μm, D95: 16 μm) | (part) | | | |
| | | Surfactant | Polyoxyethylene distyrenated phenyl ether | (part) | | | |
| | | | Polyoxyethylene (6) lauryl ether | (part) | 0.15 | | |
| | | | Polyoxyethylene (9) alkyl(sec-C11-C15) ether | (part) | | 0.15 | |
| | | | Polyoxyethylene polyoxypropylene glycol | (part) | | | 0.15 |
| Evaluation | Patch test | | | | A | A | A |
| | Tear stregth of 6 hour-aged product | | | (N/mm) | 38 | 38 | 38 |
| | Stability of tear strength of 6 hour-aged product | | | | Good | Good | Good |
| | Whether pinhole(s) exists in 6 hour-aged product | | | | Good | Good | Good |
| | Tear strength of 48 hour-aged proctact | | | (N/mm) | 42 | 42 | 42 |
| | Stability of tear strength of 48 hour-aged product | | | | Good | Good | Good |
| | Whether pinhole(s) exists in 48 hour-aged product | | | | Good | Good | Good |

Evaluation of Examples 6 to 12

As shown in Table 2, the latex composition obtained by using the xanthogen compound dispersion containing the xanthogen compound having a volume average particle size of 0.001 to 9 μm provided the dip-molded product in which the onset of symptoms of the delayed allergy (Type IV) was effectively suppressed. In addition, the obtained dip-molded product had sufficient tear strength, and further, the stability of tear strength was also high, and the generation of pinhole was effectively suppressed (Examples 6 to 12). In addition, all of the xanthogen compound dispersion of Examples 6 to 12 contained the nonionic surfactant and/or the nonionic anionic surfactant, and as is apparent from the results of Examples 6 to 12, even when the aging was shortened to 6 hours, the dip-molded products having sufficient mechanical strength could be provided. From this result, it was confirmed that, by further containing the nonionic surfactant and/or the nonionic anionic surfactant, the time required for the aging (pre-vulcanization) could be shortened and the excellent productivity was achieved.

The invention claimed is:

1. A xanthogen compound dispersion formed by dispersing a xanthogen compound in water or alcohol, wherein a volume average particle size of the xanthogen compound is 0.001 to 9 μm, and
wherein the xanthogen compound is a zinc salt of xanthic acid.

2. The xanthogen compound dispersion according to claim 1, further comprising a nonionic surfactant and/or a nonionic anionic surfactant.

3. The xanthogen compound dispersion according to claim 2, wherein the nonionic surfactant and/or the nonionic anionic surfactant have a polyoxyalkylene structure.

4. The xanthogen compound dispersion according to claim 1, wherein a 95% cumulative volume particle size (D95) of the xanthogen compound is 0.1 to 43 μm.

5. A conjugated diene polymer latex composition comprising a latex of a conjugated diene polymer, a vulcanizing agent, and the xanthogen compound dispersion according to claim 1.

6. A molded film comprising the conjugated diene polymer latex composition according to claim 5.

7. A dip-molded product formed by dip-molding the conjugated diene polymer latex composition according to claim 5.

* * * * *